United States Patent
Suzuki et al.

(10) Patent No.: US 7,701,465 B2
(45) Date of Patent: Apr. 20, 2010

(54) COLOR PROCESSING APPARATUS AND METHOD

(75) Inventors: Takahiro Suzuki, Tokyo (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1181 days.

(21) Appl. No.: 11/086,461

(22) Filed: Mar. 23, 2005

(65) Prior Publication Data

US 2005/0219586 A1 Oct. 6, 2005

(30) Foreign Application Priority Data

Mar. 31, 2004 (JP) .............................. 2004-106359

(51) Int. Cl.
G09G 5/02 (2006.01)
(52) U.S. Cl. ....................... 345/601; 345/600; 382/162; 382/167
(58) Field of Classification Search ................ 345/601, 345/600; 382/162, 167
See application file for complete search history.

(56) References Cited

U.S. PATENT DOCUMENTS

| | | | |
|---|---|---|---|
| 5,463,480 A | 10/1995 | MacDonald et al. | 358/520 |
| 5,724,442 A | 3/1998 | Ogatsu et al. | |
| 6,388,674 B1 | 5/2002 | Ito et al. | 345/590 |
| 6,633,668 B1 | 10/2003 | Newman | |
| 6,912,306 B1 | 6/2005 | Nakabayashi et al. | 382/167 |
| 7,013,042 B1 | 3/2006 | Yamada et al. | 382/167 |
| 7,027,067 B1 | 4/2006 | Ohga | 345/589 |
| 7,035,455 B2 * | 4/2006 | Choi et al. | 382/162 |
| 7,106,474 B1 * | 9/2006 | Haikin et al. | 358/1.9 |
| 7,120,295 B2 * | 10/2006 | Edge et al. | 382/162 |
| 7,173,736 B2 | 2/2007 | Yamada | |
| 7,199,900 B2 | 4/2007 | Ogatsu et al. | 358/1.9 |
| 7,263,218 B2 * | 8/2007 | Altenhof-Long et al. | 382/162 |
| 2002/0071605 A1 | 6/2002 | Iida et al. | 382/165 |
| 2003/0161530 A1 | 8/2003 | Yamada et al. | 382/167 |
| 2003/0202194 A1 | 10/2003 | Torigoe et al. | 358/1.9 |
| 2005/0024662 A1 | 2/2005 | Yamada | 358/1.9 |

(Continued)

FOREIGN PATENT DOCUMENTS

JP 8-9172 1/1996

(Continued)

OTHER PUBLICATIONS

J Kim et al., "Applying CIECAM97s in a Color Management System", *IEEE Int'l Conf on Systems Management and Cybernetics*, V 2, 8-1 Oct. 2000, pp. 1524-1528.

(Continued)

*Primary Examiner*—M Good Johnson
(74) *Attorney, Agent, or Firm*—Fitzpatrick, Cella, Harper & Scinto

(57) ABSTRACT

It is desired to adopt gamut mapping using a color appearance space in the processing system of an ICC profile. Upon generating an LUT complying with the ICC profile format, when CIEL*a*b* values are converted into CIEXYZ values, and the XYZ values are converted into color appearance space values using color appearance conversion formulas, a point which can be converted and becomes a nearest neighboring point for a point that satisfies a predetermined condition is retrieved, and corresponding color appearance space values are calculated. The obtained color appearance space values are mapped on a predetermined device gamut.

10 Claims, 25 Drawing Sheets

U.S. PATENT DOCUMENTS

| | | | |
|---|---|---|---|
| 2005/0078122 A1 | 4/2005 | Ohga | 345/589 |
| 2005/0083346 A1 | 4/2005 | Takahashi et al. | 345/604 |
| 2005/0094169 A1 | 5/2005 | Berns et al. | 358/19 |
| 2005/0219585 A1 | 10/2005 | Suzuki et al. | 358/1.9 |

FOREIGN PATENT DOCUMENTS

| | | |
|---|---|---|
| JP | 2000-40140 | 2/2000 |
| JP | 2000-253269 | 9/2000 |
| JP | 2001-103331 | 4/2001 |
| JP | 2002-152539 | 5/2002 |
| JP | 2003-143425 | 5/2003 |
| JP | 2004-96444 | 3/2004 |
| JP | 2004-096447 | 3/2004 |
| WO | WO 2004/028143 A1 | 4/2004 |

OTHER PUBLICATIONS

F Cheng et al., "Color Reproduction System Based on Color Appearance Model and Gamut Mapping", *Proc. SPIE*, vol. 4080, 2000, pp. 167-178.

GM Johnson, "Color Appearance Modeling", *ACM SIGGRAPH Course Notes* Aug. 2004, pp. 1-66.

Office Action, dated Mar. 19, 2009, in JP 2004-106359.

Office Action dated Jul. 10, 2009 in JP 2004-106360.

\* cited by examiner

FIG. 6

| R | G | B | X | Y | Z |
|---|---|---|---|---|---|
| 0 | 0 | 0 | **** | **** | **** |
| 0 | 0 | 32 | **** | **** | **** |
| 0 | 0 | 64 | **** | **** | **** |
| ⋮ | ⋮ | ⋮ | **** | **** | **** |
|   |   |   | **** | **** | **** |
| 64 | 128 | 160 |   |   |   |
| 64 | 128 | 192 |   |   |   |
| 64 | 128 | 224 |   |   |   |
| ⋮ | ⋮ | ⋮ | ⋮ | ⋮ | ⋮ |
| 255 | 255 | 224 |   |   |   |
| 255 | 255 | 255 | **** | **** | **** |

FIG. 7

| L* | a* | b* |
|---|---|---|
| 0 | −128 | −128 |
| 0 | −128 | −120 |
| 0 | −128 | 112 |
| ⋮ | ⋮ | ⋮ |
| 50 | 0 | 120 |
| 50 | 0 | 127 |
| 50 | 8 | −128 |
| ⋮ | ⋮ | ⋮ |
| 100 | 127 | 120 |
| 100 | 127 | 127 |

F I G. 14
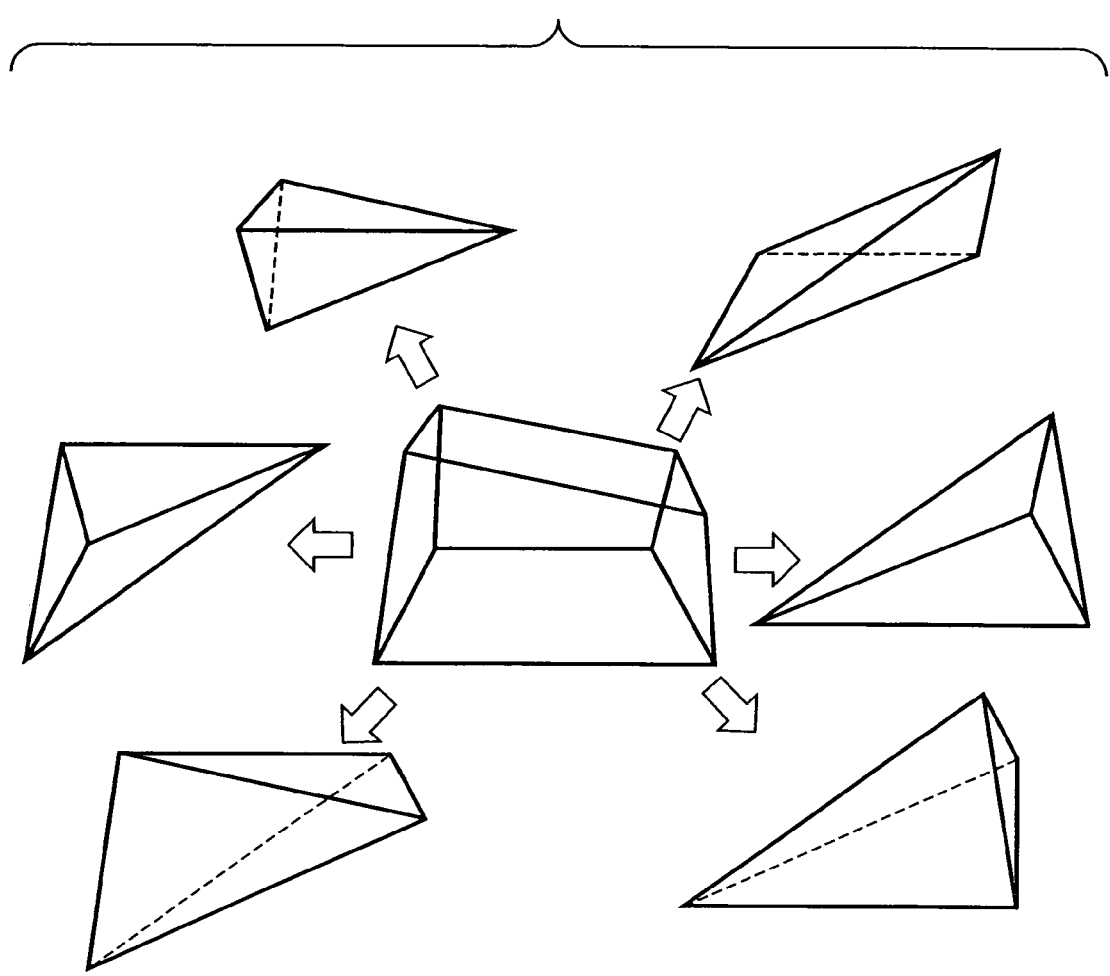

$$\overrightarrow{AP} = s\overrightarrow{AB} + t\overrightarrow{AC} + u\overrightarrow{AD}$$

COLOR PROCESSING APPARATUS AND METHOD

FIELD OF THE INVENTION

The present invention relates to a color processing apparatus and method and, more particularly, to a color process for generating a lookup table.

BACKGROUND OF THE INVENTION

In recent years, along with the popularization of personal computers, it has become easy to input an image using an image input device such as a digital camera, color scanner, or the like, to display and confirm that image using an image display device such as a CRT, LCD, or the like, and to output the image via an image output device such as a color printer or the like. In this case, in order to correct any color appearance difference due to the difference between color gamuts of the display and output devices, a color matching process (gamut mapping) is normally executed. That is, the color appearance difference between the devices is compensated for by the color matching process.

One such color matching process is a method using an ICC profile. Note that the ICC profile is a profile based on a format defined by the International Color Consortium.

As shown in FIG. 1, the process using an ICC profile converts the RGB values of an image obtained by the input device into CIEXYZ or CIEL*a*b* values as a device-independent color space using a source profile, and converts the CIEXYZ or CIEL*a*b* values into the device RGB values of the output (display) device using a destination profile. The source profile describes an RGB to XYZ conversion matrix or an RGB to Lab conversion lookup table (LUT) that represents the color reproduction character of the input device. On the other hand, the destination profile describes a Lab to device RGB LUT according to a specific format. The LUT of this destination profile has the following format. That is, grid point data obtained by evenly n-slicing (where n is an integer, and where the term "n-slicing" denotes that a region is divided into n−1 slices) an L* value region 0<L*<100, an a* value region −128<a*<127, and a b* value region −128<b*<127 are defined, and the LUT describes device RGB values obtained by mapping these L*a*b* values onto the color gamut of the output device.

In this manner, in the processing system of the ICC profile, color matching information, i.e., gamut mapping information, is described in the LUT in the destination profile together with color gamut information of the output device.

On the other hand, a color appearance model that models the human visual sense with higher precision than the conventional CIELAB color space has been announced. The color values (e.g., J*a*b* values) of this color appearance space can be calculated from CIEXYZ values. By performing gamut mapping using these J*a*b* values, color matching more suited to the human visual sense can be achieved.

When an estimation of color matching using the color appearance space realized by the processing system of the ICC profile is made, a new destination profile must be generated from a destination profile of the ICC profile. Note that this generation method is the subject matter of the present invention, which is described below, but a brief description is also provided here to provide the reader with a clearer understanding of the purpose and use of the invention.

The destination profile is embedded with the LUT in the predetermined format that describes the relationship between the L*a*b* values and RGB values (DevRGB). In other words, in order to convert color matching information using the color appearance space into a destination profile, the following processes are required: (i) the L*a*b* grid points in the predetermined format are converted into J*a*b* values using color appearance conversion formulas, (ii) the J*a*b* values are mapped into the color gamut of the output device, (iii) the mapped J*a*b* values are converted into the device RGB, and (iv) the device RGB values are stored in an LUT. The flow of calculations can be denoted as L*a*b*→J*a*b*→J*'a*'b*'→DevRGB, as shown in FIG. 2.

However, the conversion formula required to obtain the color values J*a*b* of the color appearance space does not support colors outside of the visible region. In the color appearance conversion, for example, color adaptation conversion, cone response conversion, or opponent-colors response conversion is made so the color values approximate the human visible sense. The conversion method of the color adaptation conversion is a linear conversion represented by a matrix conversion given by:

$$A' = \begin{pmatrix} a_{00} & a_{01} & a_{02} \\ a_{10} & a_{11} & a_{12} \\ a_{20} & a_{21} & a_{22} \end{pmatrix} A \quad (1)$$

The cone response conversion also involves performing, in addition to the matrix conversion, an exponentiation given by:

$$A' = \frac{b(cA/d)^e}{f + (cA/d)^e} + g \quad (2)$$

where $a_{00}$ to $a_{22}$, and b to g are constants (for $0 \leq e \leq 1$), A is a value before conversion, and A' is a value after conversion.

The opponent-colors response conversion converts the values after cone response conversion into coordinate J*a*b* values suited to the human visualsense, and linear conversion and triangular function conversion are used as representative conversion formulas for that purpose.

According to these conversion formulas, when XYZ values indicating a color outside of the visible region are input, the color adaptation conversion (equation (1)) can be calculated, but calculation errors may occur when the exponentiation, such as that in equation (2), is calculated. This is for the following reason. That is, the constants in equations (1) and (2) are set so that (cA/d) in equation (2) assumes a positive value in the case of a color within the visible region. However, (cA/d) often assumes a negative value when a color outside of the visible region is input, and this disables the calculations.

More specifically, as shown in FIG. 3, of the L*a*b* grid points defined on the CIELAB space, a color (e.g., L*=0, a*=−128, b*=−128) outside of the visible region cannot be converted into J*a*b* values, and device RGB values corresponding to that grid point cannot be calculated. In practice, when color matching is done by the processing system of the ICC profile, it is impossible for an input image to include a color outside of the visible region, but a color in proximity to a boundary of the visible region often exists in an input image. In order to interpolate such a color using an LUT, since not only grid points within the visible region but also ones outside of the visible region are used for the interpolation, appropriate device RGB values must be set for grid points outside of the visible region.

As a color matching method using the ICC profile and color appearance space, a technique disclosed in Japanese Patent Laid-Open No. 2000-40140 (U.S. application Ser. No. 09/358,407, filed on Jul. 22, 1999, now U.S. Pat. No. 7,027,067) has been proposed. However, the method disclosed in this reference is different from the method described in FIG. 2. The technique disclosed in this reference loads the color gamuts of respective devices from the source profile and destination profile described in the ICC profile format into a dedicated apparatus, and attains gamut mapping by converting the respective color gamuts into J*a*b* values using a CIECAM97 conversion formula as one of the known color appearance conversion formulas. When this technique is used, a new destination profile that records gamut mapping information on the J*a*b* space need not be generated, and the same profiles as the conventional ones need only be used. Hence, no problems are caused by impossibility of color conversion as described above. However, since this technique requires a special apparatus for color matching, it cannot be used in a general image manipulation application such as PhotoShop®. Since color matching is done using the dedicated apparatus, gamut mapping information described in the ICC profile is completely ignored. In the processing system of the ICC profile, it is required to adopt gamut mapping using the color appearance space. Not only when an ICC profile is generated but also when a process is made on the color appearance space, it is inconvenient that colors outside of the visible region are not supported.

SUMMARY OF THE INVENTION

The first aspect of the present invention discloses a color process which generates color appearance data by applying color appearance conversion using a color appearance model to color data of grid points of a lookup table, calculates color appearance data of first color data, which cannot undergo color appearance conversion, from color appearance data of second color data, which can undergo color appearance conversion, and generates a lookup table by applying a color process to the color appearance of the first and second color data.

The second aspect of the present invention discloses a color process which generates color appearance data by applying color appearance conversion using a color appearance model to color data of grid points of a lookup table, applies a color process to the color appearance data, calculates the color process result of first color data, which cannot undergo color appearance conversion, from the color process result of second color data, which can undergo color appearance conversion, and generates a lookup table on the basis of the color process results.

According to these color processes, a lookup table including input colors that cannot undergo color appearance conversion can be generated in accordance with the color process results on the color appearance space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows an example of color gamut data of an output device;

FIG. 7 shows L*a*b* grid point data stored in an LUT memory;

FIG. 14 is a view for explaining examples of division of a hexahedron for an inside/outside determination process;

DESCRIPTION OF THE PREFERRED EMBODIMENTS

Overview

When CIEL*a*b* values are converted into CIEXYZ tristimulus values, and the XYZ values are converted into color appearance space values using color appearance conversion formulas and a parameter of the profile corresponding to a viewing condition, an image process for generating an LUT complying with the ICC profile format according to the present embodiment retrieves a near neighboring point, which can be converted, with respect to a point, which satisfies a predetermined condition, and calculates corresponding color appearance space values. The obtained color appearance space values are mapped within a predetermined device gamut.

Also, when CIEL*a*b* values are converted into CIEXYZ tristimulus values, and the XYZ values are converted into color appearance space values using color appearance conversion formulas and a parameter of the profile corresponding to a viewing condition, the color appearance space values of a point that satisfies a predetermined condition are predicted from those of a neighboring grid point. The obtained color appearance space values are mapped onto a predetermined device gamut.

Furthermore, when CIEL*a*b* values are converted into CIEXYZ tristimulus values, the XYZ values are converted into color appearance space values using color appearance conversion formulas and a parameter of the profile corresponding to a viewing condition, and the obtained color appearance space values are mapped within a predetermined device gamut, a gamut mapping destination of a point that satisfies a predetermined condition is determined by the weighting calculations based on a mapping destination corresponding to a point different from that point.

First Embodiment

A process for generating an ICC profile (or a lookup table complying with the ICC compatible profile format) as the first embodiment of the present invention will be described in detail hereinafter with reference the accompanying drawings.

[Arrangement]

Figure 1:
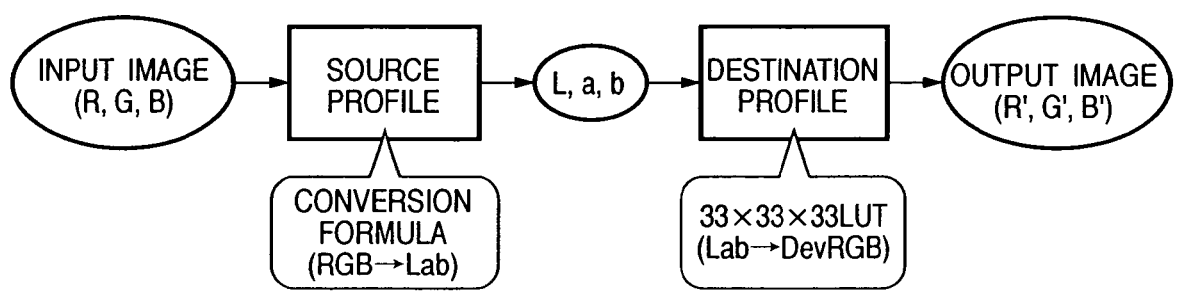
FIG. 1 is a chart showing a color matching process using an ICC profile.
Figure 2:
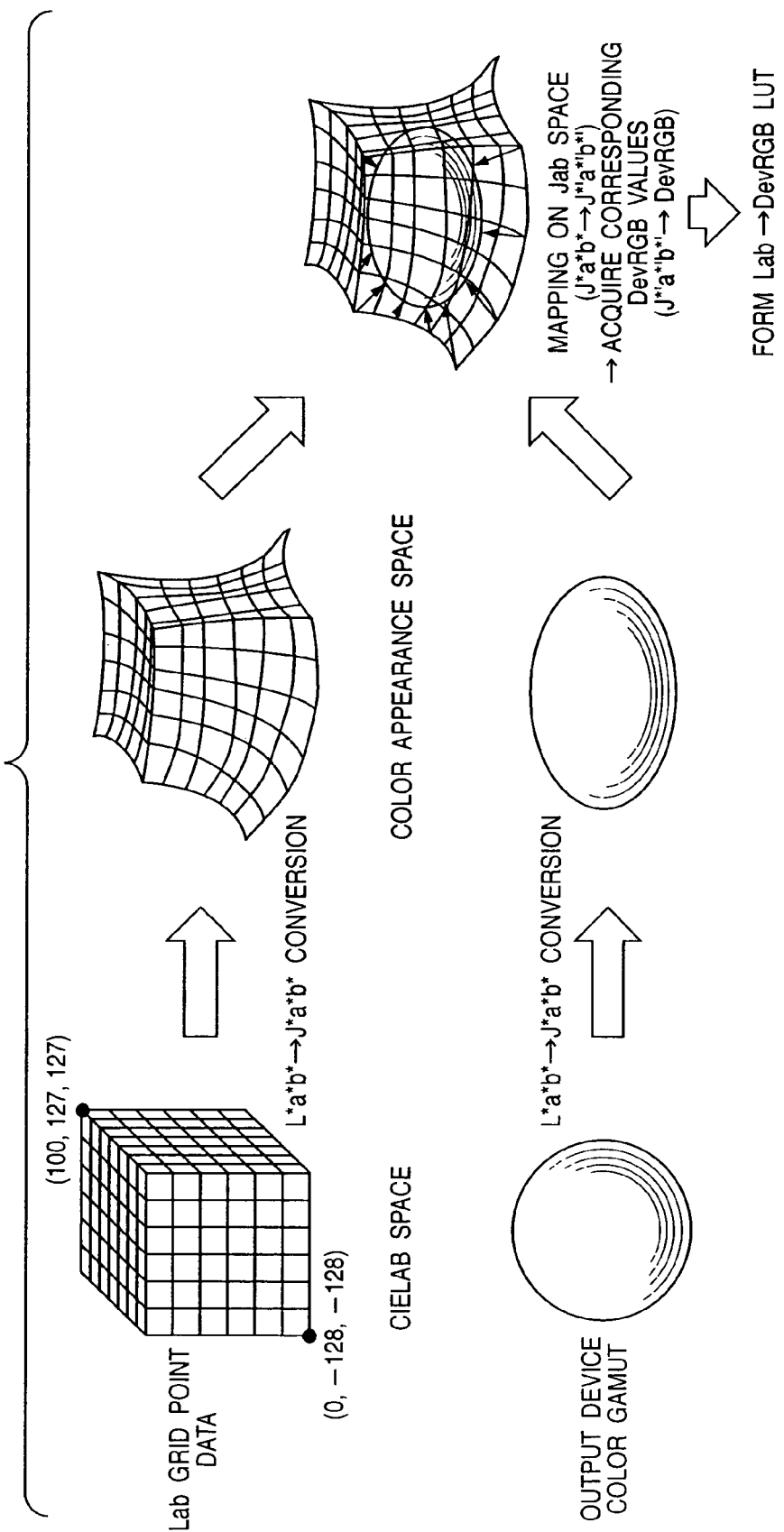
FIG. 2 is a chart showing the flow of processes upon implementing a color matching process using a color appearance space using the ICC profile.
Figure 3:
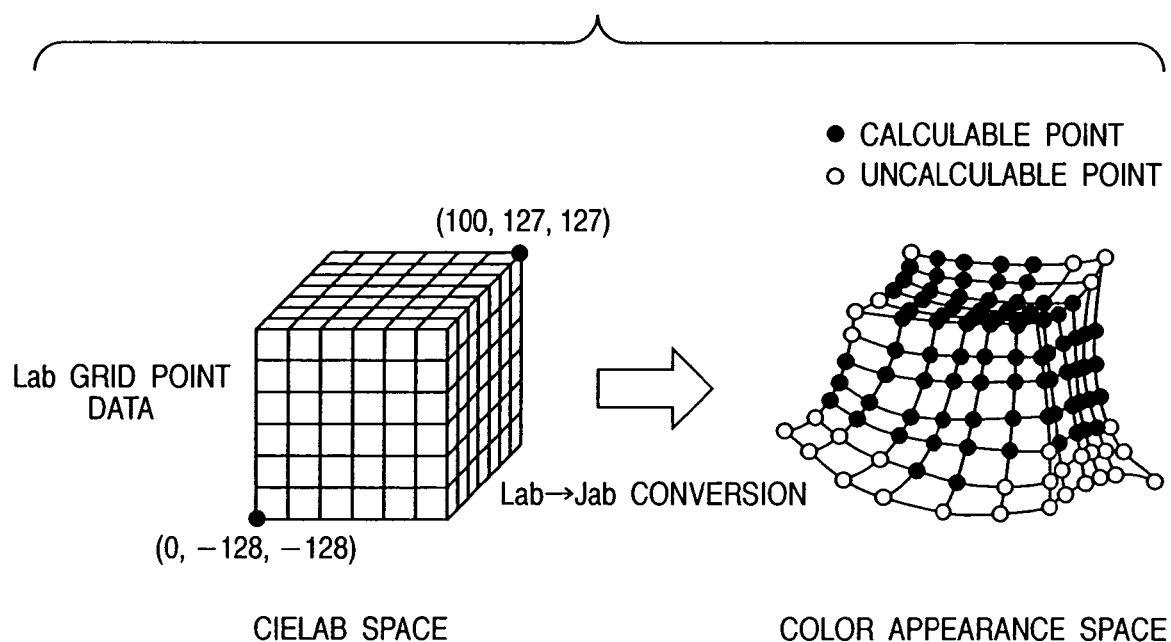
FIG. 3 is a view showing the relationship between the CIEL*a*b* grid points in the LUT of the ICC profile format, and the color appearance space.
Figure 4:
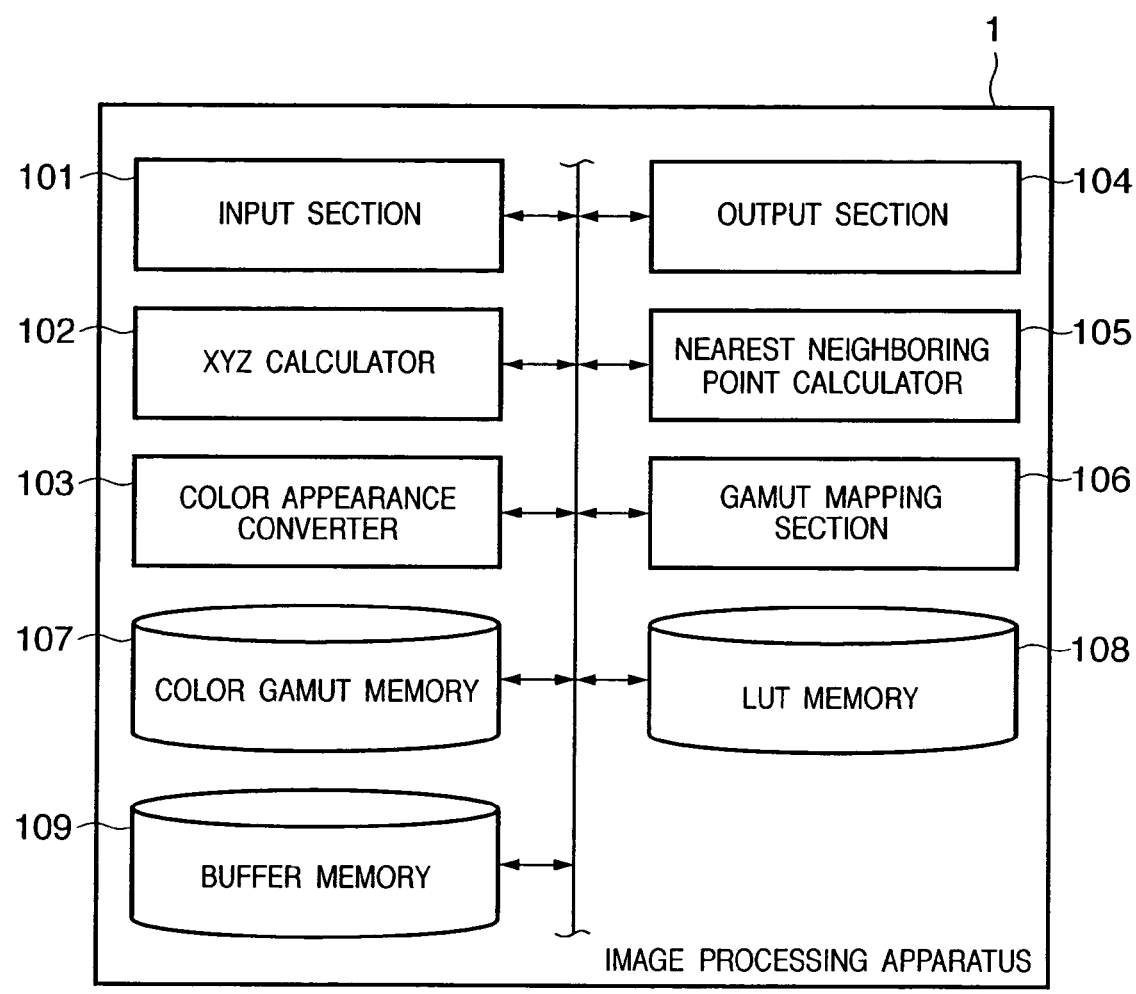
FIG. 4 is a block diagram showing the arrangement of an image processing apparatus according to the first embodiment.

FIG. 4 is a block diagram showing the arrangement an image processing apparatus 1 according to the first embodiment.

The image processing apparatus 1 has an input section 101 for inputting color gamut data of an output device, an XYZ calculator 102 for calculating CIEXYZ tristimulus values from grid point information (L*a*b*) on the CIELAB space stored in an LUT memory 108, and a color appearance converter 103 for calculating J*a*b* values using color appearance conversion formulas from the XYZ values calculated by the XYZ calculator 102, an output section 104 for outputting an LUT. Also provided is a nearest neighboring point calculator 105 for retrieving a point which can be converted into J*a*b* values and becomes a nearest neighboring point with respect to a point that cannot be converted, and calculating the J*a*b* values of the point that cannot be converted. A gamut mapping section 106 is for mapping J*a*b* values calculated by the color appearance converter 103 and nearest neighboring point calculator 105 within the color gamut of an output device stored by a color gamut memory 107, the color gamut memory 107 storing color gamut data of the output device input by the input section 101, and an LUT memory 108 is for storing the J*a*b* values corresponding to a grid point sequence and respective values on the CIELAB space, J*'a*'b*' values after being mapped onto the color gamut of the output device, and DevRGB values of the output device corresponding to the J*'a*'b*' values. A buffer memory 109 is provided for temporarily saving intermediate calculation results.

[Operation of Image Processing Apparatus]

Figure 5:
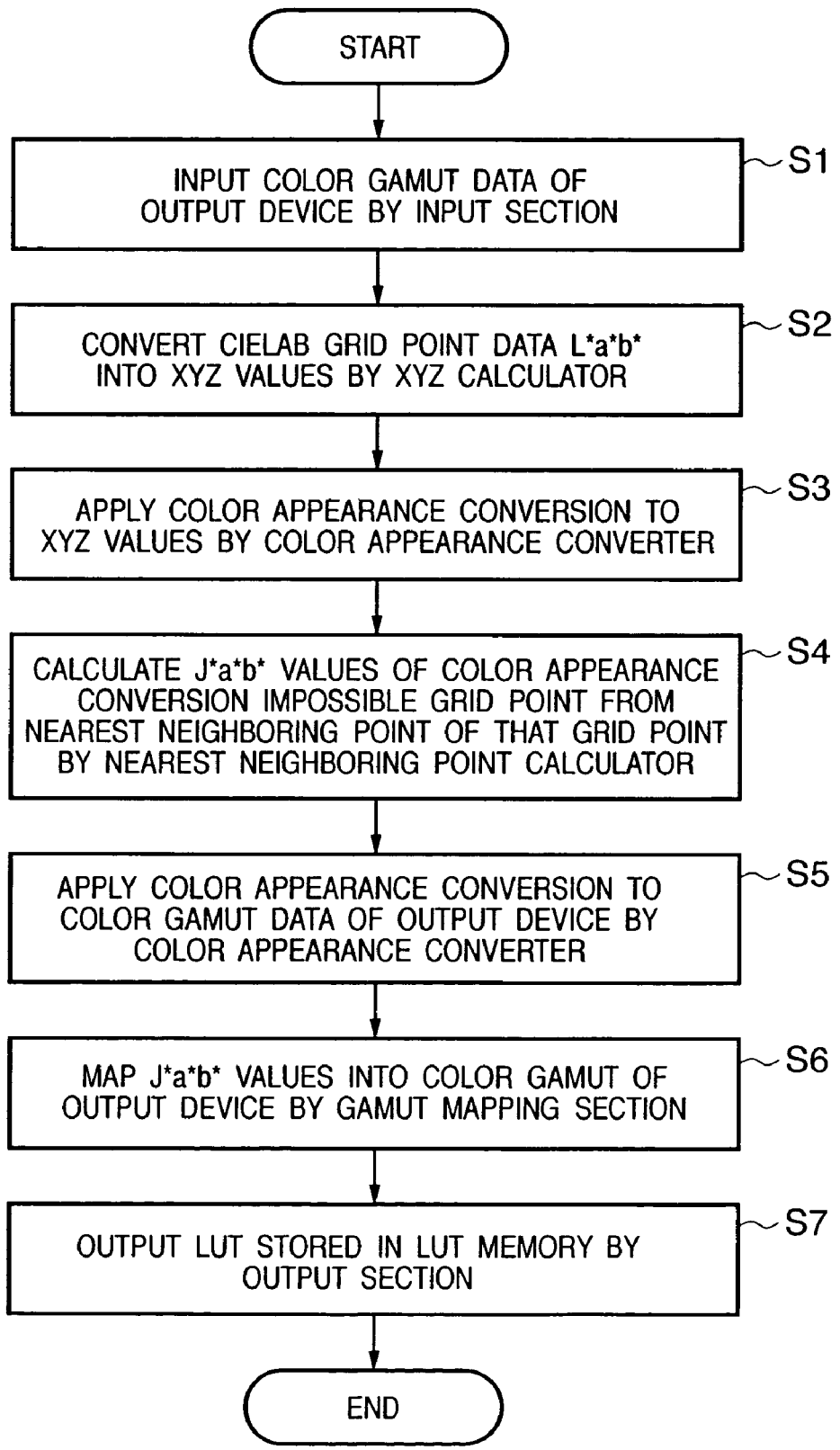
FIG. 5 is a flowchart showing the process executed by the image processing apparatus.

FIG. 5 is a flowchart showing the process to be executed by the image processing apparatus 1.

FIG. 6 shows an example of the color gamut data of the output device. For example, RGB data (729 colors) obtained by 9-slicing a region $0 \leq R, G, B \leq 255$, and output XYZ values of the output device corresponding to these data are used. As the XYZ values, data which are obtained by color patches generated by outputting the 729-color RGB data using a target output device are used.

The XYZ calculator 102 converts predetermined grid point data L*a*b* which is stored in the LUT memory 108 and expressed by CIEL*a*b*, into XYZ values (XYZ grid point data) using formulas (3), and stores them in the buffer memory 109 (S2):

$$f(Y) = (L^* + 16)/116$$

$$f(X) = a^*/500 + f(Y)$$

$$f(Z) = -b^*/200 + f(Y)$$

$$X = Xn \cdot f(X)^3 \text{ when } f(X)^3 > 0.008856$$

$$X = \{f(X) - 16/116\} \cdot Xn/7.787 \text{ when } f(X)^3 \leq 0.008856$$

$$Y = Yn \cdot f(Y)^3 \text{ when } f(Y)^3 > 0.008856$$

$$Y = \{f(Y) - 16/116\} \cdot Yn/7.787 \text{ when } f(Y)^3 < 0.008856$$

$$Z = Zn \cdot f(Z)^3 \text{ when } f(Z)^3 > 0.008856$$

$$Z = \{f(Z) - 16/116\} \cdot Zn/7.787 \text{ when } f(Z)^3 < 0.008856 \quad (3)$$

where Xn, Yn, and Zn are XYZ values of the white point (in the case of D50, (Xn, Yn, Zn)=(96.43, 100.0, 82.51)).

FIG. 7 shows L*a*b* grid point data stored in the LUT memory 108. The grid point data are a total of 35,937 colors of grid point data which have a format used in the Dst profile in the ICC profile and are obtained by evenly slicing a region $0 \leq L^* \leq 100$, a region $-128 \leq a^* \leq 127$, and a region $-128 \leq b^* \leq 127$ into 33 levels. In the following description, grid point data sliced into 33 levels are used. However, the grid point data are not limited to 33 slices. For example, 9 slices, 17 slices, or 65 slices may be used.

Formulas (3) are presented under the assumption that the white point, i.e., a light source upon observing an image output by the output device, is D50. If a different environment upon observing an image is used (e.g., D65), Xn, Yn, and Zn corresponding to that white point are used. XYZ grid point data obtained by applying calculations given by formulas (3) to all L*a*b* grid point data are saved in the buffer memory 109.

The color appearance converter 103 converts the XYZ values calculated by the XYZ calculator 102 into J*a*b* values using color appearance conversion formulas (S3). The nearest neighboring point calculator 105 calculates J*a*b* values of grid points that cannot be converted by the color appearance converter 103 on the basis of the nearest neighboring points of those grid points (S4). The color appearance converter 103 converts color gamut data (XYZ values) of the output device stored in the color gamut memory 107 into color appearance values J*a*b*, and saves them in the color gamut memory 107 (S5). DevRGB values of the output device obtained by mapping the J*a*b* values onto the color gamut of the output device by the gamut mapping section 106 are saved in the LUT memory 108 (S6). The output section 104 outputs an LUT stored in the LUT memory 108 (S7). Detailed processes of the color appearance converter 103, nearest neighboring point calculator 105, and gamut mapping section 106 in a series of processes described above will be explained later.

[Color Appearance Converter]

Figure 8:
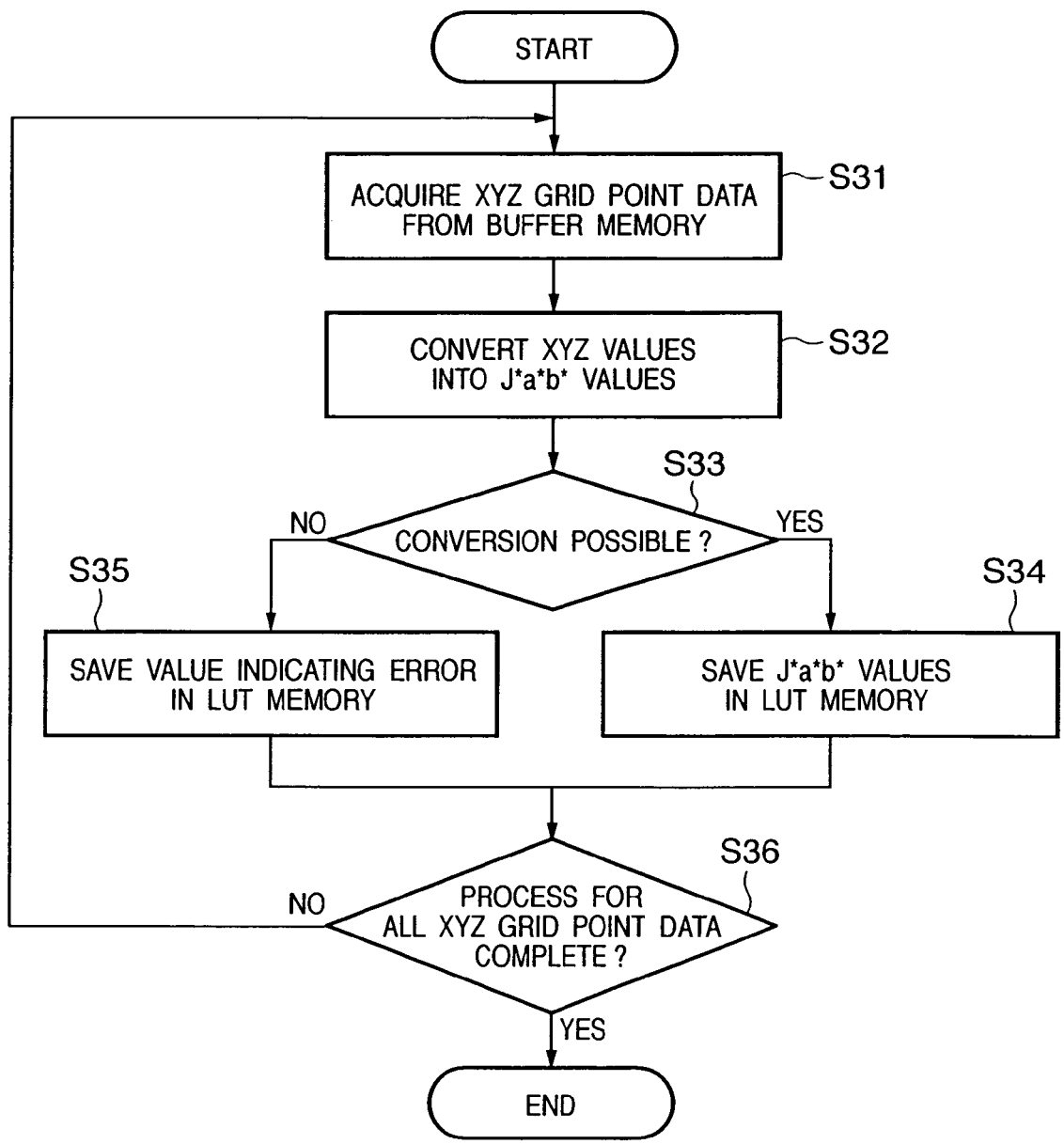
FIG. 8 is a flowchart for explaining the process of a color appearance converter.

FIG. 8 is a flowchart for explaining the process (S3) of the color appearance converter 103.

XYZ grid point data are acquired from the buffer memory 109 (S31). The acquired XYZ values are converted into J*a*b* values as color values of the color appearance space (S32). In this case, when a calculation error occurs during conversion using color appearance conversion formulas (to be referred to as "color appearance conversion" hereinafter), the calculations of that grid point are skipped.

It is checked with reference to the calculation result in step S32 if J*a*b* values can be calculated (S33). If J*a*b* values can be calculated, the calculated J*a*b* values are saved in a color appearance value storing area 1002 of the LUT memory 108 (S34). On the other hand, if J*a*b* values cannot be calculated, a value indicating an error is saved in the color appearance value storing area 1002 of the LUT memory 108 as an error process (S35).

Figure 9:
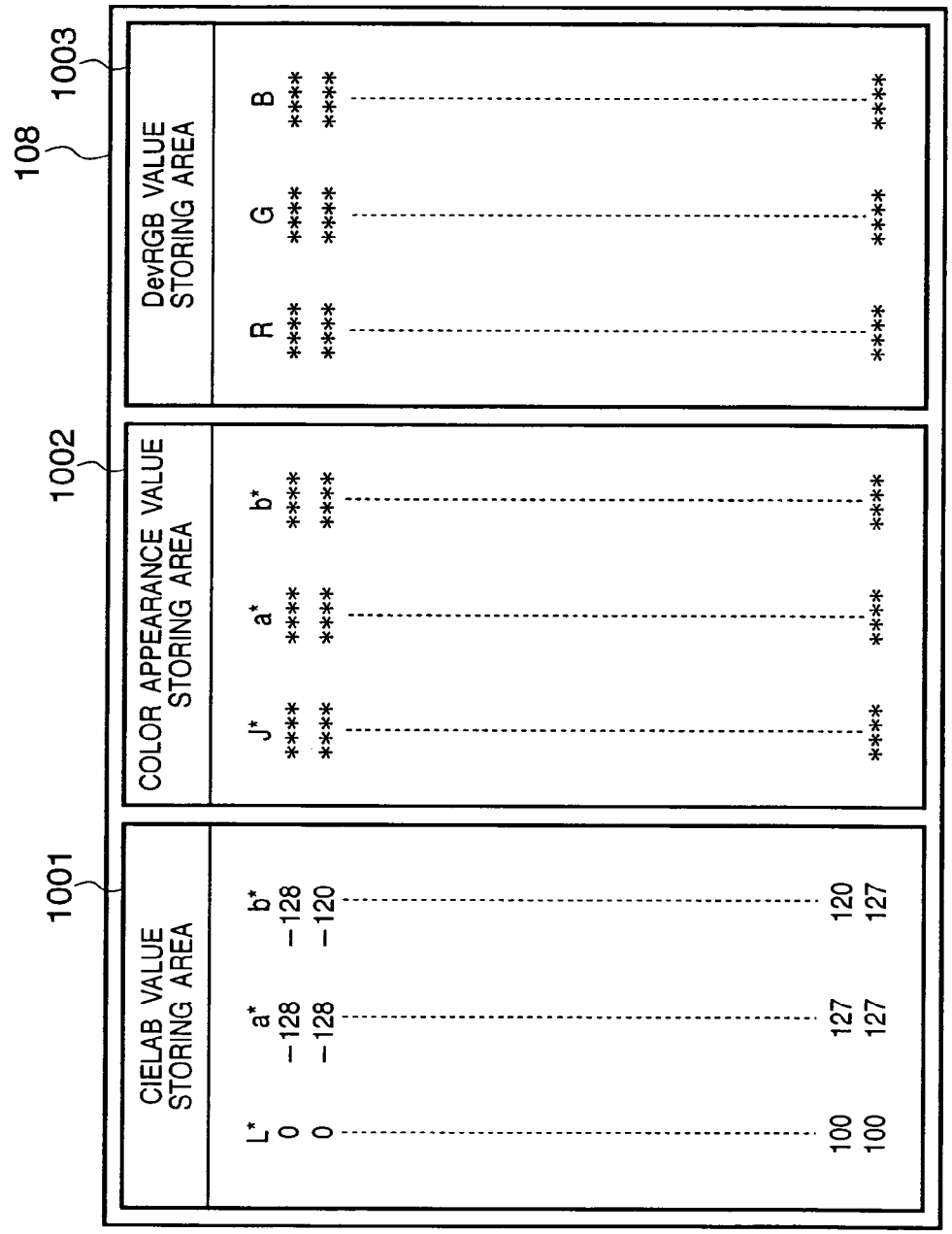
FIG. 9 shows the internal structure of the LUT memory.

FIG. 9 shows the internal structure (memory assignment) of the LUT memory 108. The LUT memory 108 has, in addition to a CIEL*a*b* value storing area 1001 that describes L*a*b* grid point data stored in advance, a color appearance value storing area 1002 for storing color appearance values J*a*b* corresponding to the values of L*a*b* grid point data, and a DevRGB value storing area 1003 for storing the DevRGB values of the output device. The calculated J*a*b* values (or a value indicating an error) are saved in the color appearance storing area 1002.

It is checked if the color appearance conversion of all XYZ grid point 5 data saved in the buffer memory 109 is complete (S36). If all the data have been converted, the process ends; otherwise, the flow returns to step S31 to repeat the aforementioned process until the conversion of all XYZ grid point data is completed.

[Nearest Neighboring Point Calculator]

Figure 10:
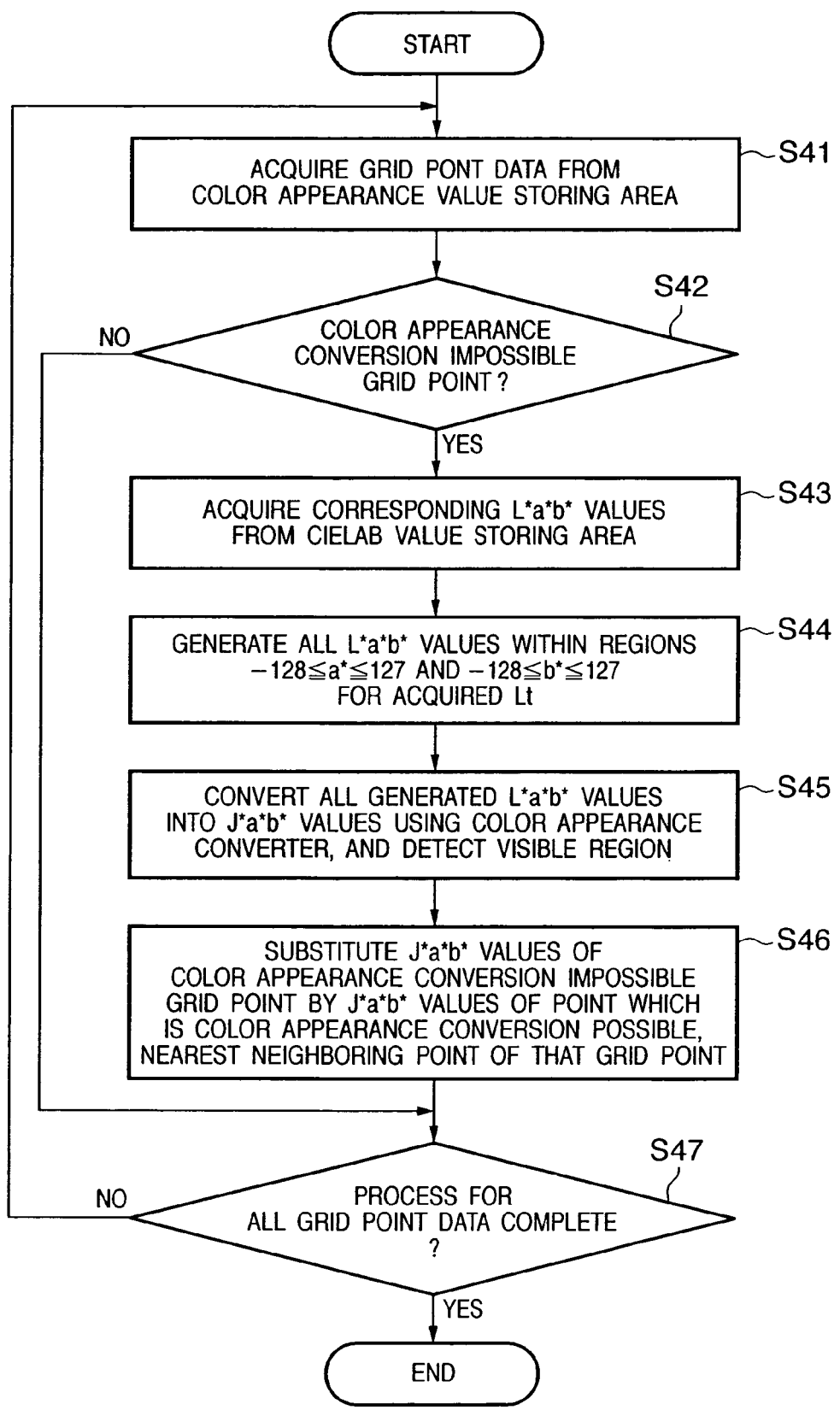
FIG. 10 is a flowchart for explaining the process of a nearest neighboring point calculator.

FIG. 10 is a flowchart for explaining the process (S4) of the nearest neighboring point calculator 105.

Grid point data stored in the color appearance value storing area 1002 of the LUT memory 108 is acquired (S41). It is checked if that grid point cannot undergo color appearance conversion, i.e., the acquired value indicates an error (S42). If the acquired values are J*a*b* values that do not indicate any error, the flow jumps to step S47.

If the acquired value indicates an error, corresponding L*a*b* values (Lt, at, bt) are acquired from the CIEL*a*b* value storing area 1001 of the LUT memory 108 (S43). All L*a*b* values (Lt, aij, bij) (i and j are integers ranging from 0 to 255) within regions $-128 \leq a^* \leq 127$ and $-128 \leq b^* \leq 127$ (a* and b* are integers) for Lt are generated, and are saved in the buffer memory 109 (S44). For example, when (Lt, at, bt)=(0, −128, −128), all L*a*b* values for L*=0 are generated, when (Lt, at, bt)=(50, 127, 127), all L*a*b* values for L*=50 are generated, and so forth.

Figure 11:
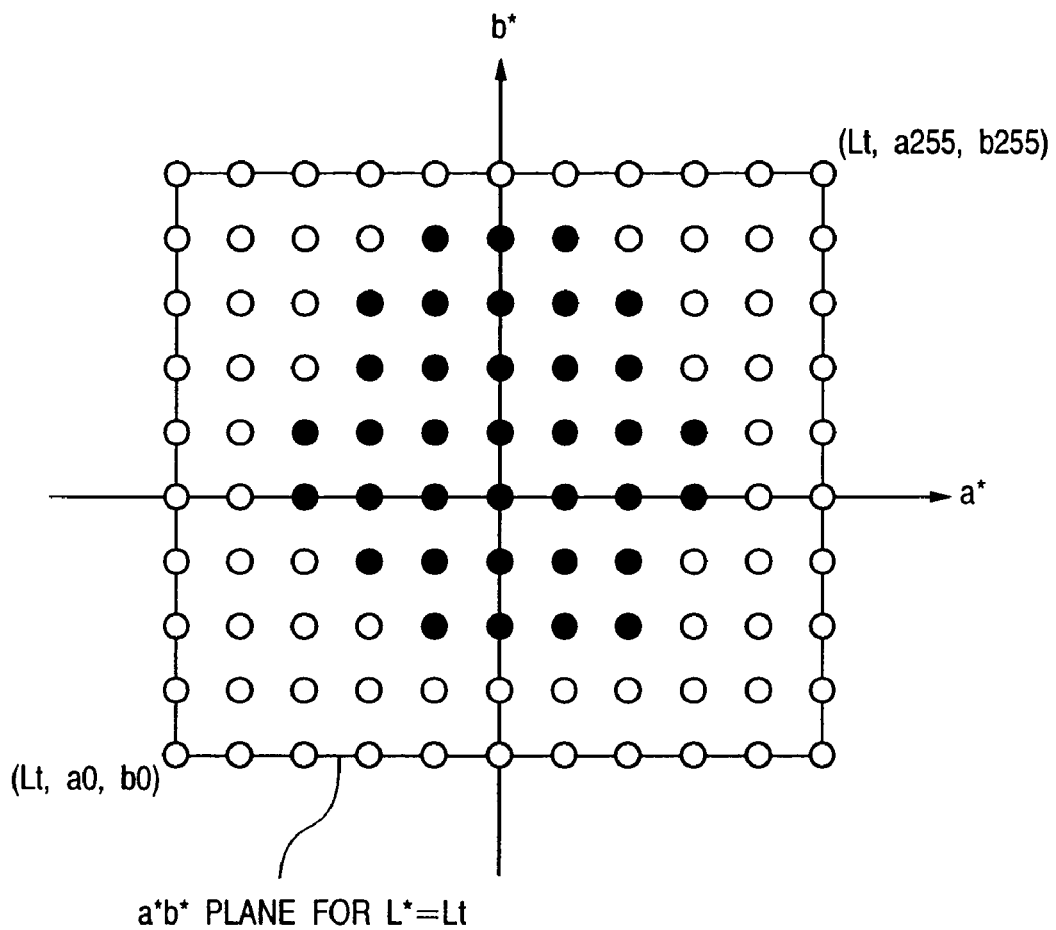
FIG. 11 shows an example of the relationship between (Lt, aij, bij) and (Jt, aij, bij)

The generated (Lt, aij, and bij) are sent to the color appearance converter 103 which converts them into color appearance values (Jt, aij, bij) and stores the converted values in the buffer memory 109 (S45). In this case, for a point that cannot be calculated, a value indicating an error is saved in the buffer memory, as described above. FIG. 11 shows an example of the relationship between (Lt, aij, bij) and (Jt, aij, bij). FIG. 11 represents the a*b* plane when L*=Lt, and (Lt, aij, bij) are mapped on this plane. Note that in FIG. 11, points that can undergo color appearance conversion of (Lt, aij, bij) are indicated by symbols ●, and points that cannot undergo color appearance conversion (in other words, points outside of the visible region, and values indicating errors saved in the buffer memory 109 in correspondence with these points) are indicated by symbols ○.

Figure 12:
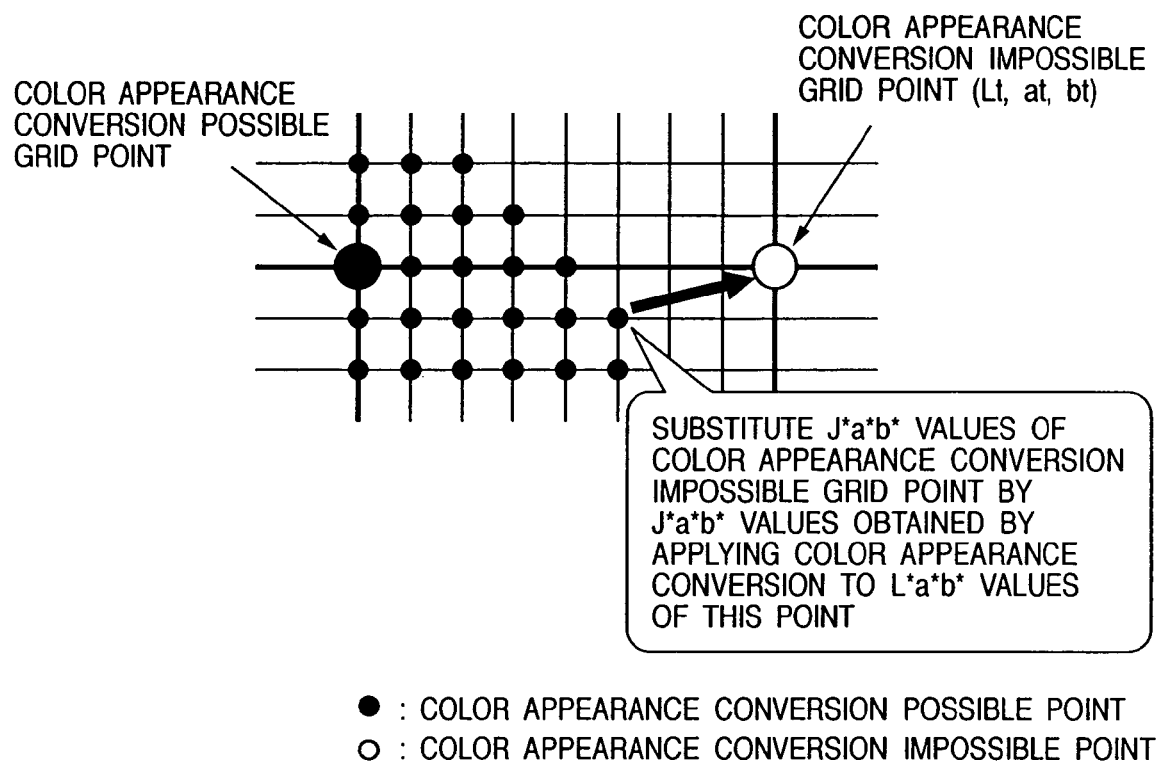
FIG. 12 shows an example of the relationship between (Lt, aij, bij) and (Lt, at, bt)

Next, J*a*b* values corresponding to the grid point (Lt, at, bt) are saved in the color appearance value storing area 1002 using (Lt, aij, bij) and (Jt, aij, bij) stored in the buffer memory 109 (S46) (the value indicating an error is replaced by J*a*b* values). More specifically, the J*a*b* values of an L*a*b* grid point (Lt, at, bt) that cannot undergo the color appearance conversion are substituted by J*a*b* values (Jt, aij, bij) of a point (Lt, aij, bij) that is closest to the L*a*b* grid point (Lt, at, bt) and can undergo color appearance conversion. FIG. 12 shows an example of the relationship between (Lt, aij, bij) and (Lt, at, bt). As shown in FIG. 12, (Lt, aij), bij) of a point ● closest to (Lt, at, bt) are substituted as J*a*b* values (Jt, at, bt) that have undergone color appearance conversion. That is, with these processes, color appearance values of a grid point outside of the visible region are substituted by color appearance converted values J*a*b* of a point within the visible region, which is closest to that grid point.

A check is made to determine whether the processing of all grid point data stored in the color appearance value storing area 1002 is complete (S47). If the process is complete, the process ends; otherwise, the flow returns to step S41 to repeat the aforementioned process until the process of all grid point data is completed.

[Gamut Mapping Section]

Figure 13:
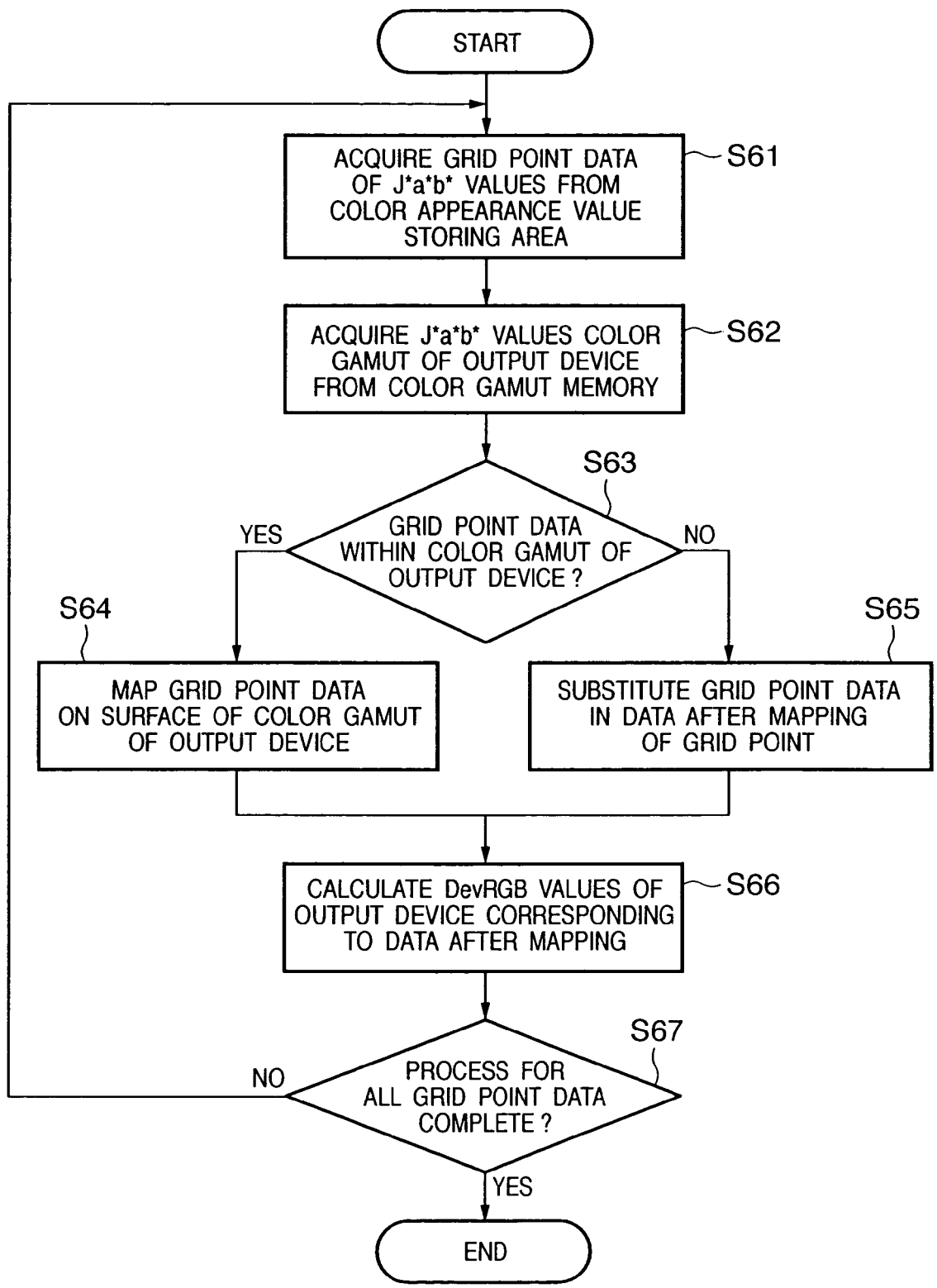
FIG. 13 is a flowchart for explaining the process of a gamut mapping section.

FIG. 13 is a flowchart for explaining the process (S6) of the gamut mapping section 106.

Grid point data (Jt, at, bt) of J*a*b* values is acquired from the color appearance value storing area 1002 of the LUT memory 108 (S61), and J*a*b* values indicating the color gamut of the output device (calculated in step S5) are acquired from the color gamut memory 107 (S62). A check is then made as to whether the grid point data (Jt, at, bt) falls within the color gamut of the output device (S63).

Color Gamut Inside/Outside Determination Method

In this embodiment, the color gamut of the output device is expressed by 729 points of data obtained by 9-slicing RGB data, i.e., 512 hexahedrons. Therefore, if the grid point data (Jt, at, bt) is included in any of the 512 hexahedron, it can be determined that the grid point data falls within the color gamut of the output device. In this embodiment, each hexahedron is further divided into six tetrahedrons, as shown in FIG. 14, and inside/outside determination for determining if each tetrahedron includes a grid point is made, thereby determining whether or not the grid point data are included in the hexahedron.

Figure 15:
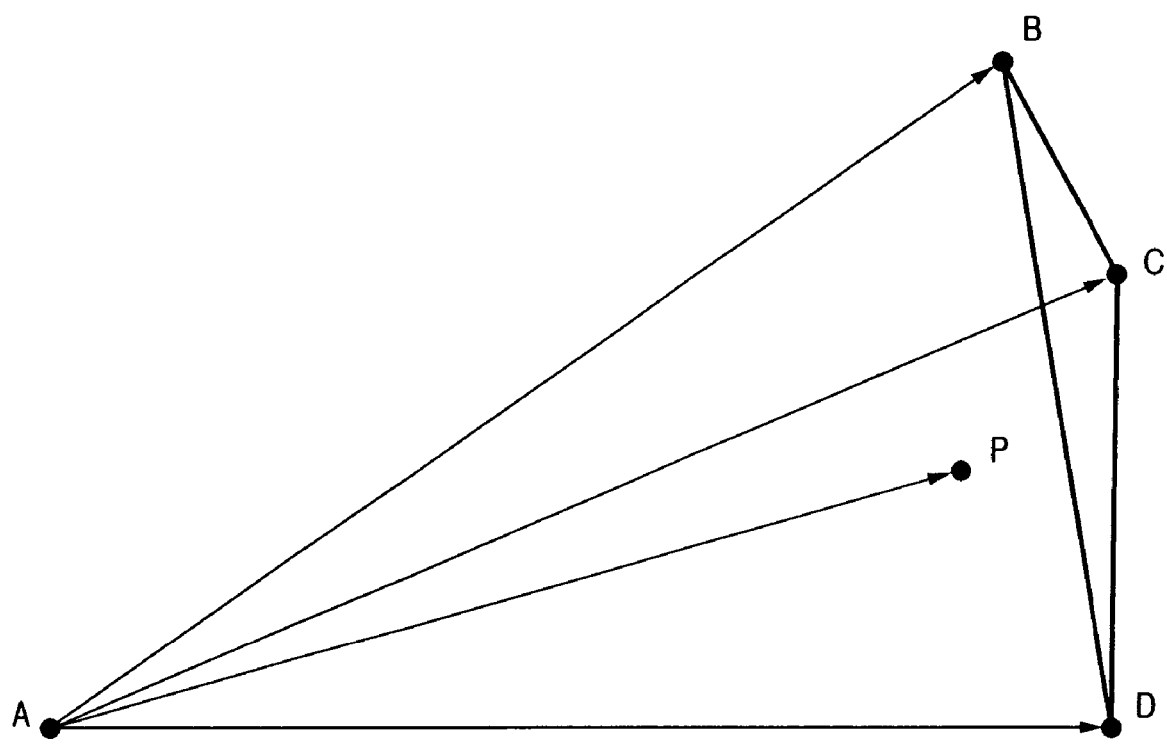
FIG. 15 is a view for explaining determination of the inside/outside of a tetrahedron.

FIG. 15 is a view for explaining inside/outside determination for a tetrahedron. Let A, B, C, and D be the vertices of a tetrahedron, P be grid point data, and ↑AB be a vector from a point A to a point B. Then, we have:

$$\uparrow AP = s \uparrow AB + t \uparrow AC + u \uparrow AD \tag{4}$$

At this time, if the point P is included in the tetrahedron ABCD, inequalities (5) and (6) hold:

$$S+t+u \leq 1 \tag{5}$$

$$s \geq 0, t \geq 0, u > 0 \tag{6}$$

If inequalities (5) and (6) hold, it can be determined that the point P is present within the tetrahedron; otherwise, it can be determined that the point P is present outside the tetrahedron.

By executing the aforementioned inside/outside determination of the tetrahedron for six tetrahedrons, inside/outside determination of a hexahedron can be made. Furthermore, when this inside/outside determination of a hexahedron is executed for 512 hexahedrons, inside/outside determination for determining whether grid point data fall within the visible region is complete.

Figure 16:
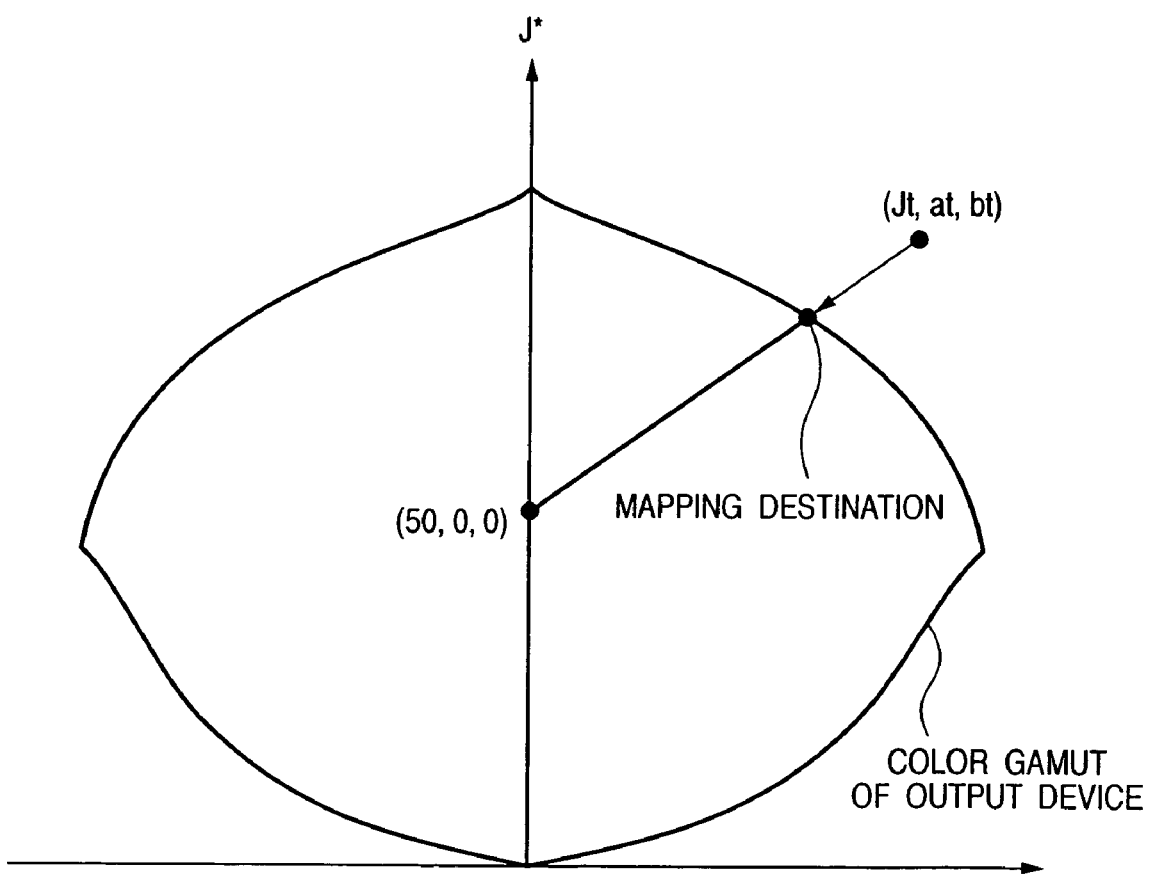
FIG. 16 shows an example of mapping of grid point data outside of the visible region.

If it is determined that the grid point falls within the color gamut, grid point data (Jt, at, bt) is substituted in data (Lk, ak, bk) after mapping (S64); otherwise, that grid point (Jt, at, bt) is mapped onto the surface of the color gamut of the output device (S65). FIG. 16 shows a mapping example of grid point data outside the color gamut. For example, a line that connects grid point data (Jt, at, bt) and intermediate gray values (J*, a*, b*)=(50, 0, 0) on the color appearance space is defined, and the grid point data (Jt, at, bt) is mapped on an intersection between that line and the color gamut of the output device. That is, the coordinate values of that intersection are substituted in the mapped data (Jk, ak, bk). Since the intersection can be easily calculated by solving an equation of a plane formed by three neighboring points that are located on the plane of the color gamut of the output device, and an equation of the line, a description thereof will be omitted.

Next, DevRGB values of the output device corresponding to the mapped data (Jk, ak, bk) are calculated, and are saved in the DevRGB value storing area 1003 of the LUT memory 108 (S66). An example of the DevRGB calculation method will be described using FIG. 15. As described above, a point within a device gamut can be expressed by equation (4), and satisfies inequalities (5) and (6). Hence, a tetrahedron ABCD which satisfies this condition is retrieved to calculate s, t, and u in equation (4). Then, DevRGB values can be obtained using:

$$R=R_A+s(R_B-R_A)+t(R_C-R_A)+u(R_D-R_A)$$

$$G=G_A+s(G_B-G_A)+t(G_C-G_A)+u(G_D-G_A)$$

$$B=B_A+s(B_B-B_A)+t(B_C-B_A)+u(B_D-B_A) \quad (7)$$

where $R_A$, $G_A$, and $B_A$ are DevRGB values corresponding to point A, $R_B$, $G_B$, and $B_B$ are DevRGB values corresponding to point B, $R_C$, $G_C$, and $B_C$ are DevRGB values corresponding to point C, and $R_D$, $G_D$, and $B_D$ are DevRGB values corresponding to point D. The DevRGB values of respective vertices are stored in the color gamut memory 107.

A check is made as to whether the processing of all grid point data is complete (S67). If the processing is complete, the process ends; otherwise, the flow returns to step S61 to repeat the aforementioned process until the process of all grid point data is completed.

As described above, upon generating the LUT of the ICC profile format that describes the mapping process using the color appearance space, the color appearance values of a point that cannot be calculated by the color appearance conversion formulas (a grid point outside of the visible region, which cannot undergo color appearance conversion), are substituted by those of a nearest neighboring point within the visible region, thus generating an LUT free from any information loss for grid points outside of the visible region. Hence, upon converting an image by the ICC profile using this LUT, when a color that barely falls within the visible region is input and is interpolated using grid points outside of the visible region, a satisfactory conversion result can be obtained.

Second Embodiment

An image process according to the second embodiment of the present invention will be described below. Note that the same reference numerals in the second embodiment denote the same parts as in the first embodiment, and a detailed description thereof will be omitted.

Figure 17:
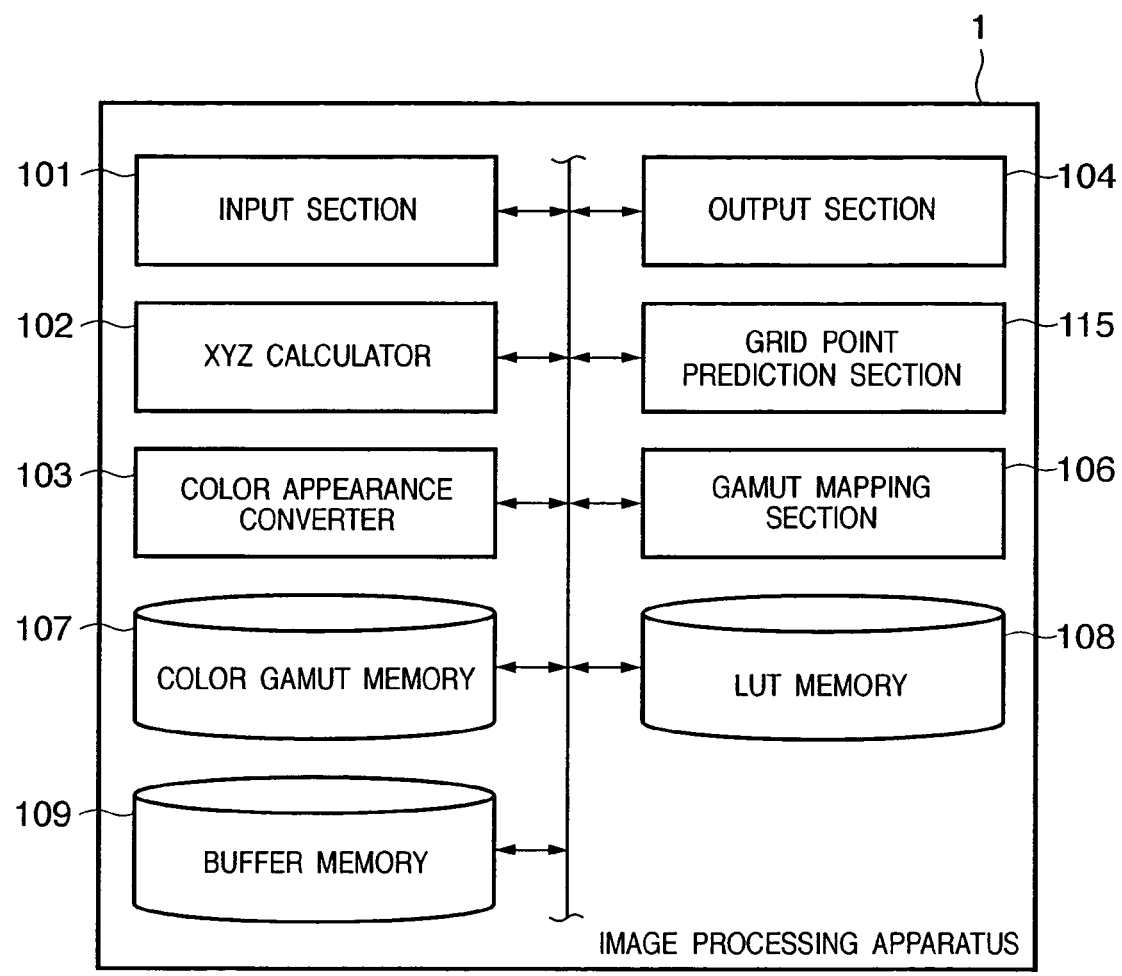
FIG. 17 is a block diagram showing the arrangement of an image processing apparatus according to the second embodiment.

FIG. 17 is a block diagram showing the arrangement of an image processing apparatus 1 according to the second embodiment. The difference from the arrangement of the first embodiment shown in FIG. 4 is as follows. In the first embodiment, for a point which cannot be converted into J*a*b* values by the color appearance converter 103, the nearest neighboring point calculator 105 retrieves a point that can be converted and uses that point as a nearest neighboring point, to calculate J*a*b* values for the point that cannot be converted. In place of this nearest neighboring point calculator 105, the second embodiment has a grid point prediction section 115 which predicts the J*a*b* values of the point that cannot be converted using those of a neighboring point that can be converted.

Figure 18:
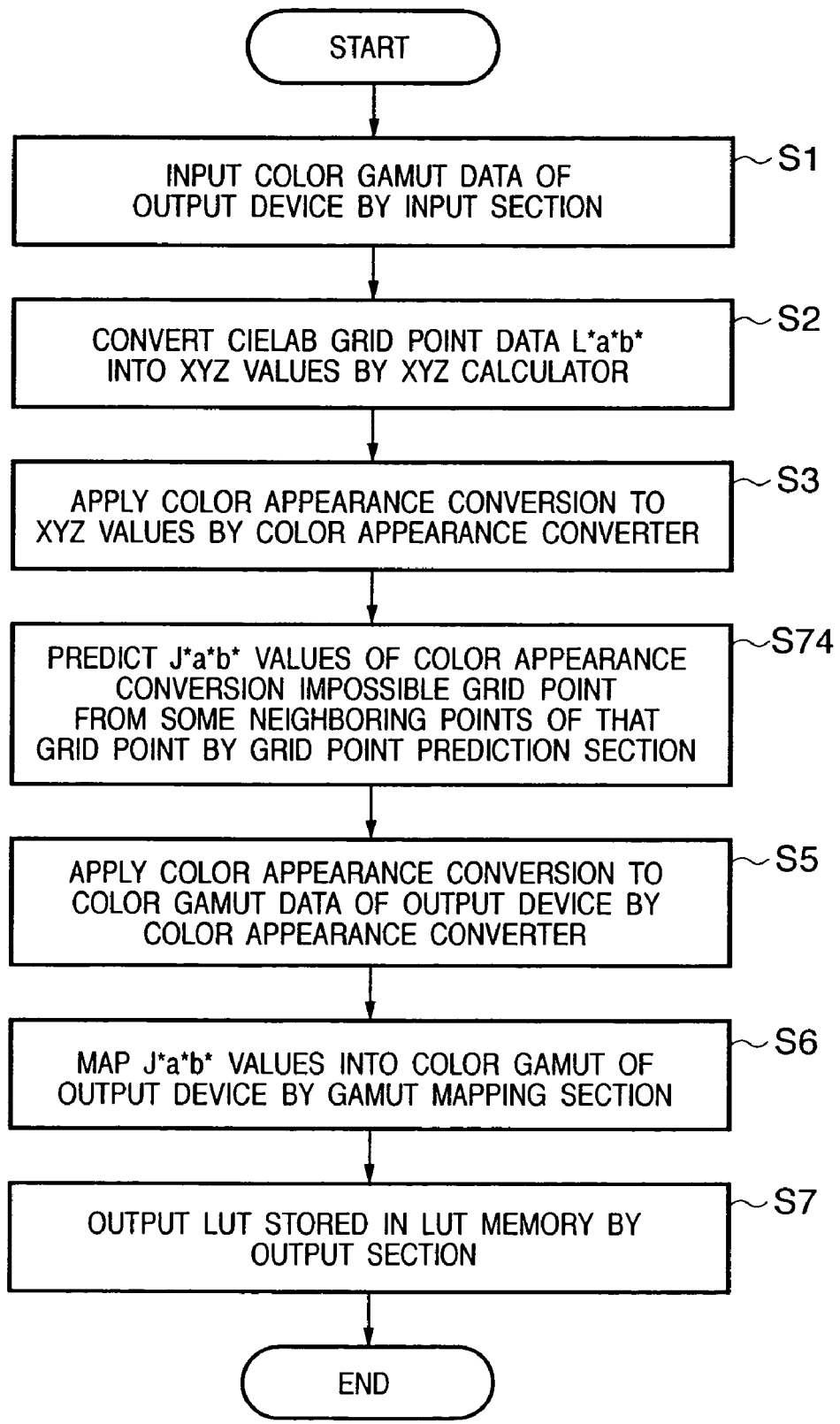
FIG. 18 is a flowchart showing the process executed by the image processing apparatus according to the second embodiment.

FIG. 18 is a flowchart showing the process executed by the image processing apparatus 1 according to the second embodiment. In the process of the first embodiment shown in FIG. 5, the nearest neighboring point calculator 105 calculates the J*a*b* values of a grid point that cannot be converted by the color appearance converter 103 on the basis of the nearest neighboring point of that grid point in step S4. In the second embodiment, the grid point prediction section 115 predicts the J*a*b* values of a grid point which cannot be converted by the color appearance converter 103 on the basis of the number of neighboring points of that grid point (S74).

If an error value is input, the error value is input to mapped data (Jk, ak, bk), and the flow advances to step S55. The color gamut inside/outside determination will be described below.

[Grid Point Prediction Section]

Figure 19:
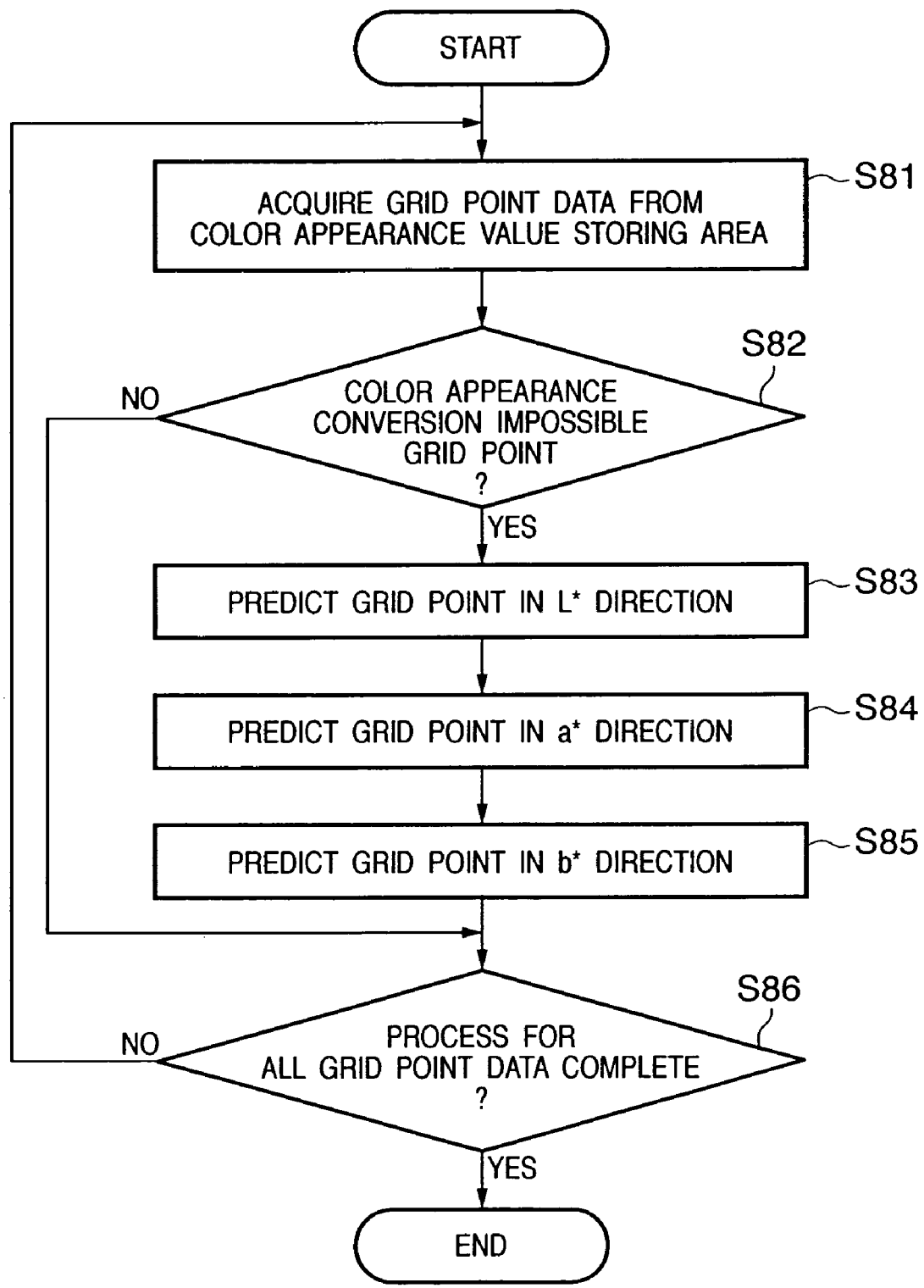
FIG. 19 is a flowchart for explaining the process of a grid point prediction section.

FIG. 19 is a flowchart for explaining the process (S74) of the grid point prediction section 115.

Grid point data stored in the color appearance value storing area 1002 of the LUT memory 108 is acquired (S81), and a check is made as to whether that grid point is unable to undergo color appearance conversion, i.e., if the acquired value indicates an error (S82). If the acquired values are J*a*b* values that do not indicate any error, the flow jumps to step S86.

If the acquired value indicates an error, a grid point in an L* direction is predicted (S83), that in an a* direction is predicted (S84), and that in a b* direction is predicted (S85). Since the same process is executed to predict the grid points in the L*, a*, and b* directions, details of this process will be explained later.

A check is made as to whether the processing of all grid point data stored in the color appearance value storing area 1002 is complete (S86). If the processing is complete, the process ends; otherwise, the flow returns to step S81 to repeat the aforementioned process until the process of all grid point data is completed.

[Grid Point Prediction Method]

Figure 20:
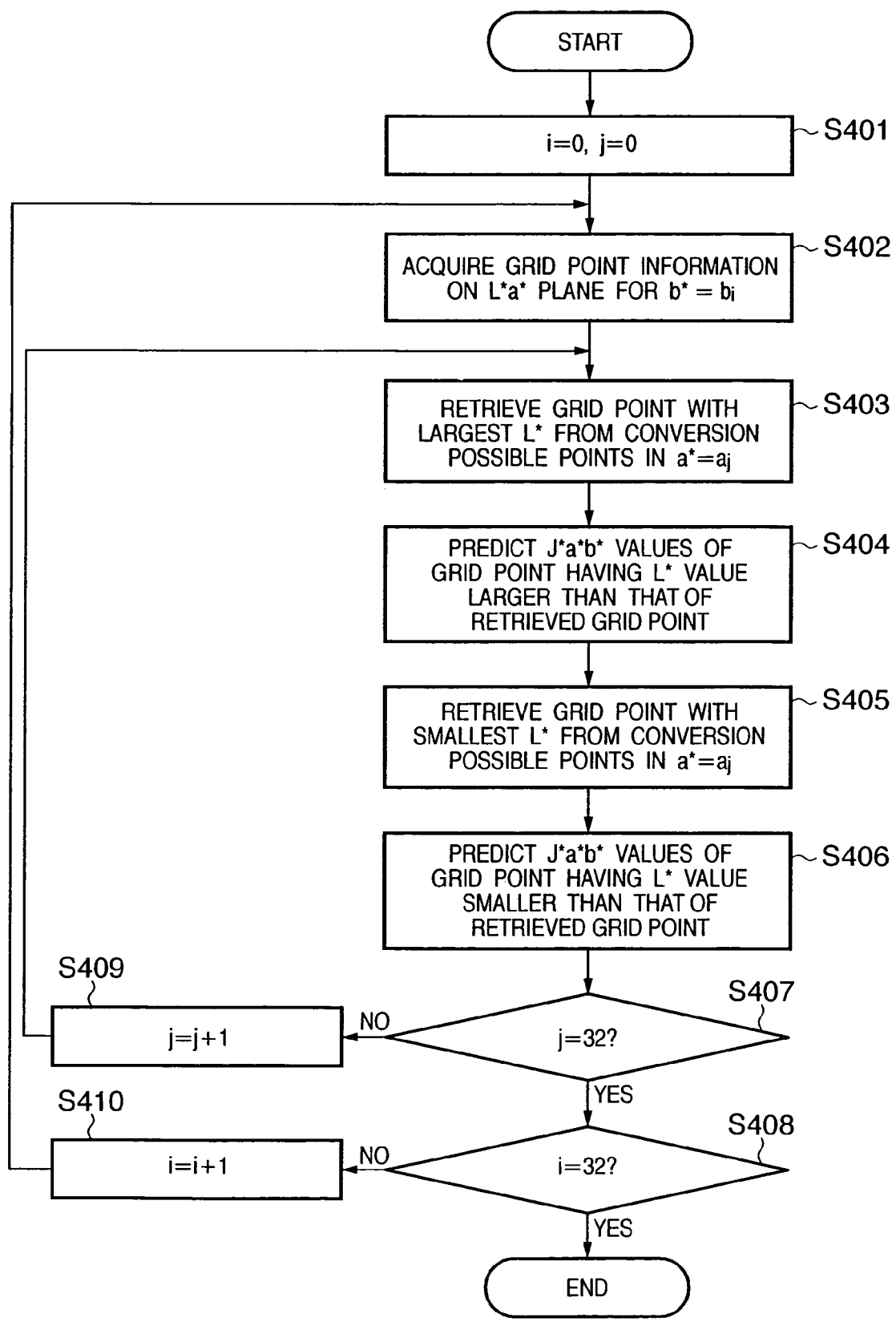
FIG. 20 is a flowchart for explaining prediction in an L* direction by the grid point prediction section.

FIG. 20 is a flowchart for explaining prediction in the L* direction by the grid point prediction section 115.

Zero is substituted in indices i and j indicating the numbers of grid point in the b* and a* directions (S401). In this embodiment, since 0≦i and j≦32, both a* and b* are assigned numbers in ascending order (from −128 to 127).

Figure 21:
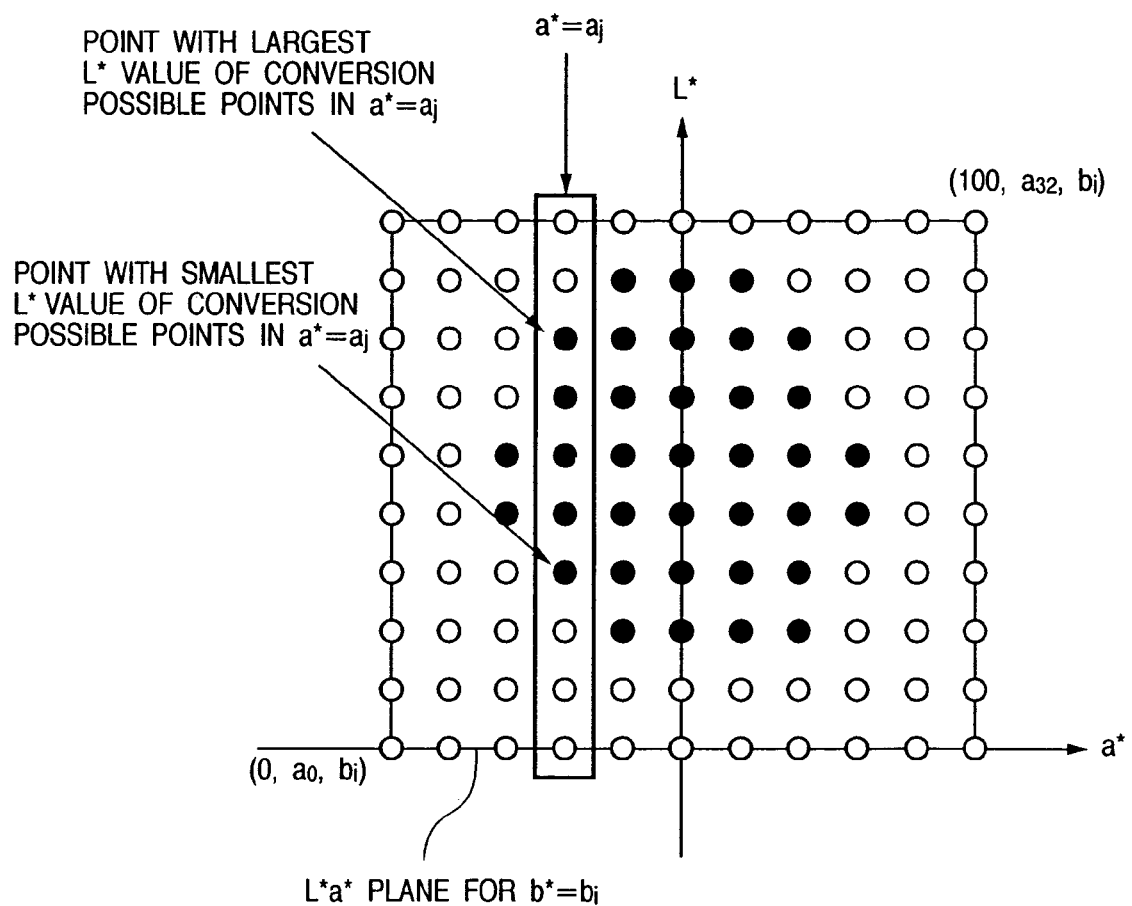
FIG. 21 is a view for explaining prediction in the L* direction by the grid point prediction section.

Next, all grid point data (in this embodiment, 33×33=1089 points) on the L*a* plane for b*=$b_i$ are acquired (S402), and a grid point with a largest L* value of those which can undergo color appearance conversion for a*=$a_j$ is retrieved (S403). FIG. 21 shows an example of the L*a* plane for b*=$b_i$. From a grid point sequence on a line of a*=$a_j$, a grid point with a largest L* value of those which can undergo color appearance conversion is retrieved.

Using the color appearance values of the retrieved grid point with the largest L* value and that with the second largest L* value, color appearance values of a grid point having an L* value one level larger than the grid point with the largest L* value is predicted (S404). For example, if the retrieved grid point with the largest L* value is the k-th grid point $L_k a_j b_i$, color appearance values $J_{k+1} a_j b_i$ of a grid point $L_{k+1} a_j b_i$ which cannot undergo color appearance conversion is predicted from color appearance values $J_k a_j b_i$ and $J_{k-1} a_j b_i$ of that grid point and a grid point $L_{k-1} a_j b_i$ with the second largest L* value. This prediction can use a linear prediction formula given by:

$$J_{k+1} a_j b_i = 2 \cdot J_k a_j b_i - J_{k-1} a_j b_i \quad (8)$$

Next, a grid point with a smallest L* value of those which can undergo color appearance conversion for $a^* = a_j$ is retrieved. (S405). That is, a grid point with a smallest L* value of those which can undergo color appearance conversion is retrieved from a grid point sequence on a line $a^* = a_j$ on the L*a* plane shown in FIG. 21.

Using the color appearance values of the retrieved grid point with the smallest L* value and that with the second smallest L* value, color appearance values of a grid point having an L* value one level smaller than the grid point with the smallest L* value is predicted (S406). For example, if the retrieved grid point with the smallest L* value is the p-th grid point $L_p a_j b_i$, color appearance values $J_{p-1} a_j b_i$ of a grid point $L_{p-1} a_j b_i$ which cannot undergo color appearance conversion is predicted from color appearance values $J_p a_j b_i$ and $J_{p+1} a_j b_i$ of that grid point and a grid point $L_{p+1} a_j b_i$ with the second smallest L* value. This prediction can use a linear prediction formula given by:

$$J_{p-1} a_j b_i = 2 \cdot J_p a_j b_i - J_{p+1} a_j b_i \quad (9)$$

Next, index j is checked (S407). If j<32, j is incremented (S409), and the flow returns to step S403. On the other hand, if j=32, index i is checked (S408), and if i<32, i is incremented (S410), and the flow returns to step S402. On the other hand, if i=32, the process ends.

In the above description, the prediction method in the L* direction has been explained. By replacing the relationship of b*, a*, and L* each other, the prediction methods in the a* and b* directions are attained. Hence, a description of the prediction methods in the a* and b* directions will be omitted.

The linear calculation used in predicting color appearance values of a grid point is not limited to that which uses the color appearance values of two neighboring grid points. For example, a linear calculation that uses the color appearance values of three neighboring grid points may be adopted. In this case, prediction calculation formulas are, for example, given by:

$$J_{k+1} a_j b_i = 3 \cdot J_k a_j b_i - 3 \cdot J_{k-1} a_j b_i + J_{k-2} a_j b_i \quad (10)$$

$$J_{p-1} a_j b_i = 3 \cdot J_p a_j b_i - 3 \cdot J_{p+1} a_j b_i + J_{p+2} a_j b_i \quad (11)$$

Furthermore, prediction need not always use a linear calculation, and other calculations may be used as long as they are calculation formulas that can predict grid points.

In this manner, upon generating the LUT of the ICC profile format that describes the mapping process using the color appearance space, the color appearance values of a point that cannot be calculated by the color appearance conversion formulas (a grid point outside of the visible region, which cannot undergo color appearance conversion), are predicted from those of neighboring grid points within the visible region, thus generating an LUT free from any information loss for grid points outside of the visible region. Hence, upon converting an image by the ICC profile using this LUT, when a color that barely falls within the visible region is input and is interpolated using grid points outside of the visible region, a satisfactory conversion result can be obtained.

Third Embodiment

An image process according to the third embodiment of the present invention will be described below. Note that the same reference numerals in the third embodiment denote substantially the same parts as in the first and second embodiments, and a detailed description thereof will be omitted.

Figure 22:
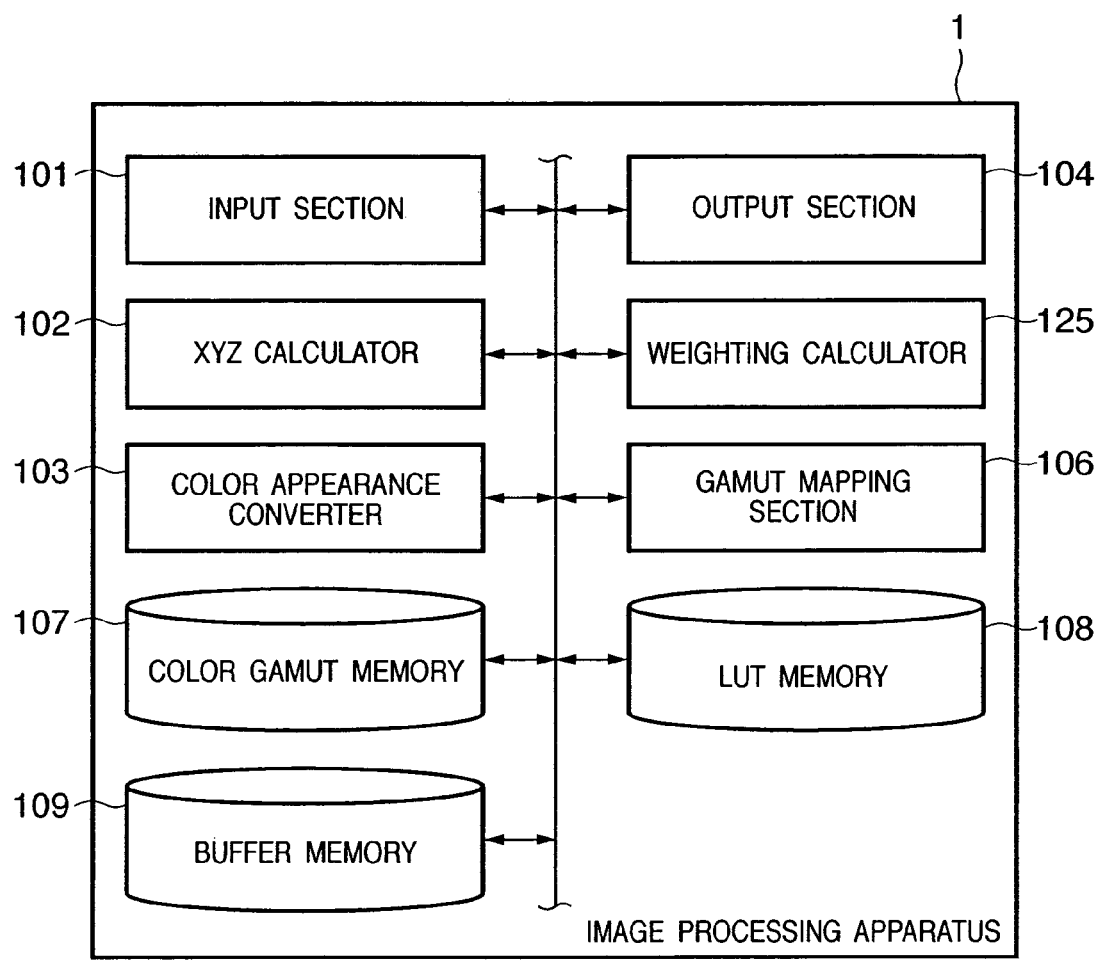
FIG. 22 is a block diagram showing the arrangement of an image processing apparatus according to the third embodiment.

FIG. 22 is a block diagram showing the arrangement of an image processing apparatus 1 according to the third embodiment. The difference from the arrangement of the first embodiment shown in FIG. 4 is as follows. In the first embodiment, for a point that cannot be converted into J*a*b* values by the color appearance converter 103, the nearest neighboring point calculator 105 retrieves a point that can be converted and uses that point as a nearest neighboring point, to calculate J*a*b* values for the point that cannot be converted. In place of this nearest neighboring point calculator 105, the third embodiment has a weighting calculator 125, which calculates DevRGB values of a mapping destination corresponding to a point that cannot be converted, by means of weighting calculations.

Figure 23:
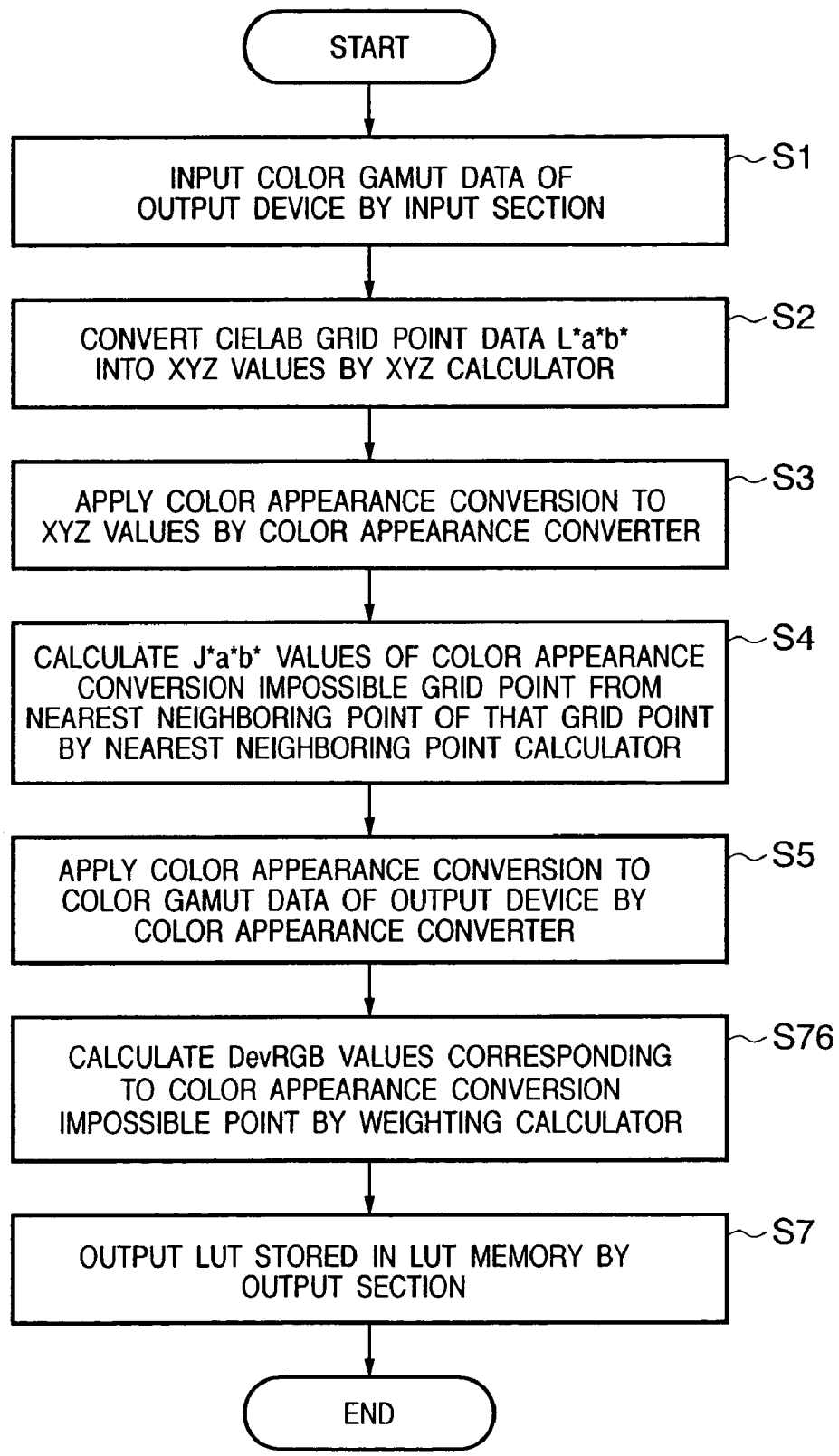
FIG. 23 is a flowchart showing the process executed by the image processing apparatus according to the third embodiment.

FIG. 23 is a flowchart showing the process executed by the image processing apparatus 1 according to the third embodiment. In the processes of the first and second embodiments, the J*a*b* values of a grid point that cannot undergo color appearance conversion are calculated from the nearest neighboring point of that grid point or are predicted from a number of neighboring points of that grid point. However, in the third embodiment, the weighting calculator 125 calculates DevRGB values of a mapping destination of a point that cannot undergo color appearance conversion (S76).

Note that if a value indicating an error is input (S61 in FIG. 13), the gamut mapping section 106 of the third embodiment substitutes the value indicating an error as mapped data (S64), and also substitutes the value indicating an error in the DevRGB value storing area 1003 of the LUT memory 108 shown in FIG. 9 as DevRGB values corresponding to the mapped data (S66).

[Weighting Calculator]

Figure 24:
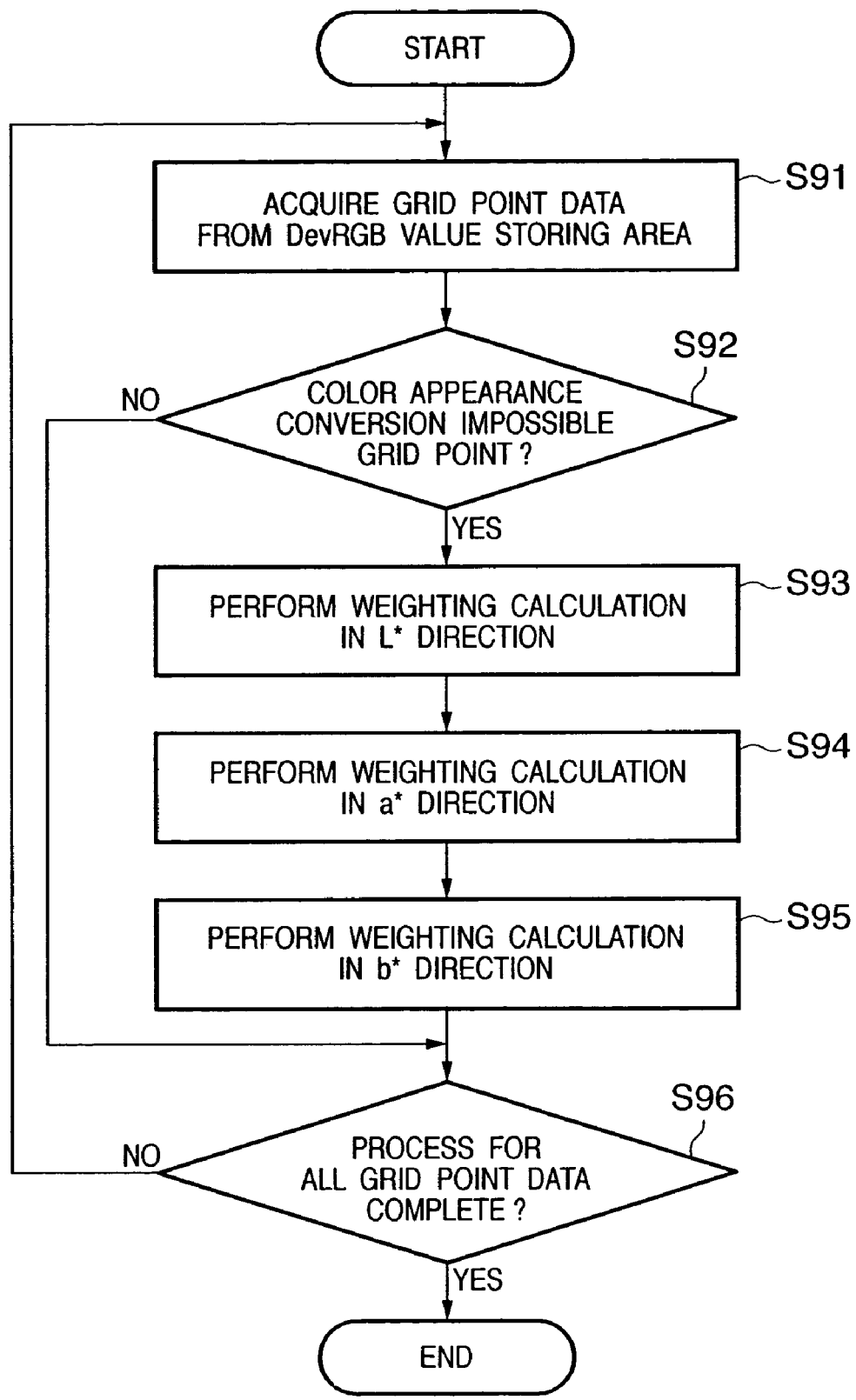
FIG. 24 is a flowchart for explaining the process of a weighting calculator.

FIG. 24 is a flowchart for explaining the process (S76) of the weighting calculator 125.

Grid point data stored in the color appearance value storing area 1002 of the LUT memory 108 is acquired (S91), and a check is made as to whether that grid point is unable to undergo color appearance conversion, i.e., if the acquired value indicates an error (S92). If the acquired values are J*a*b* values that do not indicate any error, the flow jumps to step S96.

If the acquired value indicates an error, weighting calculations are made in an L* direction (S93), in an a* direction (S94), and in a b* direction (S95). Since the same process is executed to make the weighting calculations in the L*, a*, and b* directions, details of this process will be explained later.

A check is made as to whether the processing of all grid point data stored in the DevRGB value storing area 1003 is complete (S96). If the processing is complete, the process ends; otherwise, the flow returns to step S91 to repeat the aforementioned process until the process of all grid point data is completed.

[Calculation of DevRGB Value by Weighting Calculation]

Figure 25:
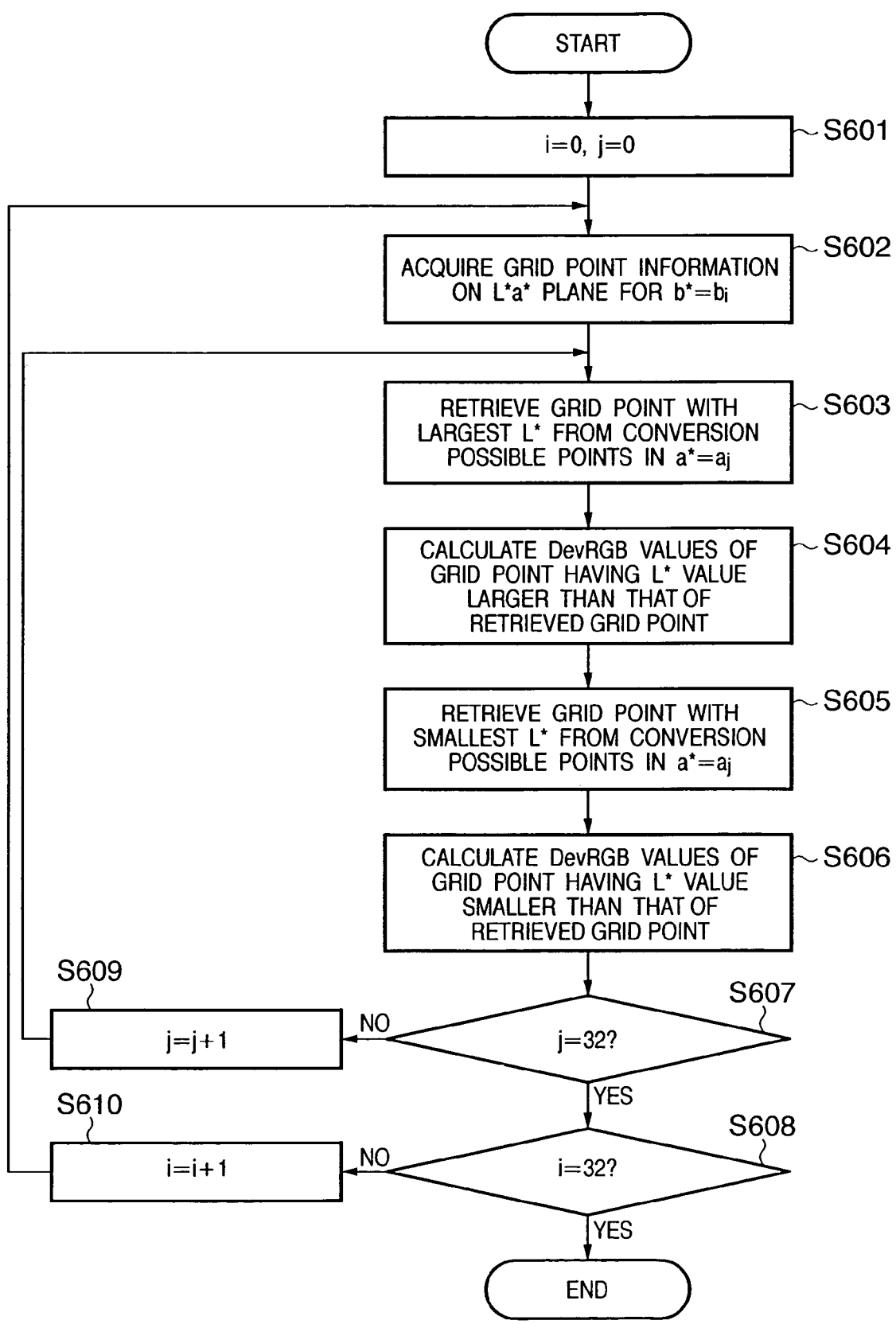
FIG. 25 is a flowchart for explaining the calculations of DevRGB values based on the weighting calculations in the L* direction by the weighting calculator.

FIG. 25 is a flowchart for explaining the calculation of DevRGB values based on the weighting calculation in the L* direction by the weighting calculator 125.

Zero is substituted in indices i and j indicating the grid point in question in the b* and a* directions (S601). In this embodiment, since $0 \leq i$ and $j \leq 32$, both a* and b* are assigned numbers in ascending order (from −128 to 127).

Next, all grid point data (in this embodiment, 33×33=1089 points) on the L*a* plane for $b^* = b_i$ are acquired (S602), and a grid point with a largest L* value of those which can undergo color appearance conversion for $a^* = a_j$ is retrieved (S603). From a grid point sequence on a line of $a^* = a_j$ shown in FIG. 21, a grid point with a largest L* value of those which can undergo color appearance conversion is retrieved.

Using the DevRGB values of mapping destinations of the retrieved grid point with the largest L* value and that with the second largest L* value, DevRGB values of a grid point having an L* value one level larger than the grid point with the largest L* value are calculated (S604). For example, if the retrieved grid point with the largest L* value is the k-th grid point $L_k a_j b_i$, DevRGB values $R_{k+1} G_j B_i$ of a grid point $L_{k+1} a_j b_i$ which cannot undergo color appearance conversion are calculated from DevRGB values $R_k G_j B_i$ and $R_{k-1} G_j B_i$ of the mapping destinations of that grid point and a grid point $L_{k-1} a_j b_i$ with the second largest L* value. This calculation can use a linear prediction formula given by:

$$R_{k+1}G_jB_i = u \cdot R_k G_j B_i + v \cdot R_{k-1} G_j B_i \tag{12}$$

where u and v are weights.

Next, a grid point with a smallest L* value of those which can undergo color appearance conversion for $a^* = a_j$ is retrieved. (S605). That is, a grid point with a smallest L* value of those which can undergo color appearance conversion is retrieved from a grid point sequence on a line $a^* = a_j$ on the L*a* plane shown in FIG. 21.

Using the DevRGB values of the mapping destinations of the retrieved grid point with the smallest L* value and that with the second smallest L* value, DevRGB values of a grid point having an L* value one level smaller than the grid point with the smallest L* value are calculated (S606). For example, if the retrieved grid point with the smallest L* value is the p-th grid point $L_p a_j b_i$, DevRGB values $R_{p-1} G_j B_i$ of a grid point $L_{p-1} a_j b_i$ which cannot undergo color appearance conversion are predicted from DevRGB values $R_p G_j B_i$ and $R_{p+1} G_j B_i$ of the mapping destinations of that grid point and a grid point $L_{p+1} a_j b_i$ with the second smallest L* value. This calculation can use a linear prediction formula given by:

$$R_{p-1}G_jB_i = u \cdot R_p G_j B_i + v \cdot R_{p+1} G_j B_i \tag{13}$$

where u and v are weights.

Next, index j is checked (S607). If j<32, j is incremented (S609), and the flow returns to step S603. On the other hand, if j=32, index i is checked (S608), and if i<32, i is incremented (S610), and the flow returns to step S602. On the other hand, if i=32, the process ends.

In the above description, the weighting calculation in the L* direction has been explained. By interchanging b*, a*, and L* with each other in the above description, the weighting calculations in the a* and b* directions are attained. Hence, individual descriptions of the weighting calculations in the a* and b* directions will be omitted.

The linear calculation used in calculating DevRGB values of a grid point is not limited to that which uses the color appearance values of two neighboring grid points. For example, a linear calculation which uses the color appearance values of three neighboring grid points may be adopted. In this case, prediction calculation formulas are, for example, given by:

$$R_{k+1}G_jB_i = u \cdot R_k G_j B_i + v \cdot R_{k-1} G_j B_i + w \cdot R_{k-2} G_j B_i \tag{14}$$

$$R_{p-1}G_jB_i = u \cdot R_p G_j B_i + v \cdot R_{p+1} G_j B_i + w \cdot R_{p+2} G_j B_i \tag{15}$$

where u, v, and w are weights.

Furthermore, the prediction process need not always use a linear calculation, and any other calculations may be used as long as they are calculation formulas that can predict grid points.

In this manner, upon generating the LUT of the ICC profile format that describes the mapping process using the color appearance space, the mapping destination of a point which cannot be calculated by the color appearance conversion formulas (a grid point outside of the visible region, which cannot undergo color appearance conversion), is calculated by the weighting calculation using the DevRGB values of the mapping destinations of neighboring grid points of that point, thus generating an LUT free from any information loss for grid points outside of the visible region. Hence, upon converting an image by means of the ICC profile using this LUT, when a color that barely falls within the visible region is input and is interpolated using grid points outside of the visible region, a satisfactory conversion result can be obtained.

Modification of Preceding Embodiment

In the description of the above embodiment, output device gamut data to be loaded by the input section 101 are CIEXYZ values. Alternatively, color appearance values J*a*b* that have undergone color appearance conversion in advance may be input.

In the above embodiment, the output device gamut to be input is expressed by CIEXYZ values obtained by 9-slicing RGB data. However, the present invention is not limited to nine slices, and any other numbers of slices may be adopted as long as the color gamut of the output device can be specified. For example, the number of slices may be decreased to five or seven so as to reduce the computation volume, or it may be increased to 12 or 17 so as to improve precision. Hence, the number of slices can be selectively used depending on the purpose intended.

The process of the gamut mapping section 106 in the above embodiment adopts the method of expressing a color within the output device gamut intact, and mapping a color outside the color gamut on the surface of the color gamut. However, the present invention is not limited to this. For example, a method of converting a color within the color gamut into a specific color, or a method of mapping a color outside the color gamut into the color gamut to maintain tone may be used.

The above embodiment has exemplified the color appearance space that models the human visual character with higher precision. As examples of the color appearance space, CIECAM97s, CIECAM02, and the like specified (recommended) by CIE are available.

A lookup table which can input a color that cannot undergo color appearance conversion poses the same problems. Hence, in the above embodiment, a lookup table complying with the ICC profile format is generated. Also, the present invention can be applied to generation of a lookup table which does not comply with the ICC profile format.

According to the aforementioned embodiments, an LUT obtained by converting the gamut mapping process on the color appearance space into an ICC profile can be generated.

In this case, an LUT free from any information loss for grid points outside of the visible region can be generated by substituting color appearance values of a grid point outside of the visible region which cannot undergo color appearance conversion by those of a nearest neighboring point of that grid point within the visible region, or predicting such color appearance values from those of neighboring points within the visible region, or calculating a mapping destination of a grid point outside of the visible region which cannot undergo color appearance conversion by the weighting calculations using values of the mapping destinations of neighboring points of that point. Hence, upon converting an image by the ICC profile using this LUT, when a color that barely falls within the visible region is input and is interpolated using grid points outside of the visible region, satisfactory conversion can be done, and a high-quality image can be output.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by means of a CPU or MPU of the computer system or apparatus, from the storage medium, and then executing the program.

In this case, the program codes read from the storage medium realize the functions according to the foregoing embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing program codes read by a computer, the present invention includes a case where an OS (operating system) or the like working on the computer performs a part or all of the processes in accordance with designations of the program codes and realizes some or all of the functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or all of the process in accordance with designations of the program codes and realizes some or all of the functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-106359, filed on Mar. 31, 2004, which is hereby incorporated by reference herein.

What is claimed is:

1. A method of generating a lookup table for color processing constructed by plural grid points including a grid point which corresponds to color data without a visible range, said method comprising the steps of:

generating color appearance data by applying color appearance conversion using a color appearance model to color data corresponding to the plural grid points;

applying color processing to the color appearance data;

generating the lookup table based on the color appearance data to which the color processing is applied;

holding information specifying input color data which cannot undergo the color appearance conversion;

calculating color appearance data of input color data specified by the held information from color appearance data of input color data which can undergo the color appearance conversion; and storing the lookup table in a memory.

2. The method according to claim 1, wherein the calculating step includes a step of determining the color appearance data of the input color data, which can undergo the color appearance conversion and is located in the neighborhood of the input color data which cannot undergo the color appearance conversion, as the color appearance data of the input color data which cannot undergo the color appearance conversion.

3. A computer-readable storage medium comprising a computer-executable program for causing a computer to perform a method of generating a lookup table for color processing constructed by plural grid points including a grid point which corresponds to color data without a visible range, said method comprising the steps of:

generating color appearance data by applying color appearance conversion using a color appearance model to color data corresponding to the plural grid points;

applying color processing to the color appearance data;

generating the lookup table based on the color appearance data to which the color processing is applied;

holding information specifying input color data which cannot undergo the color appearance conversion; and calculating color appearance data of input color data specified by the held information from color appearance data of input color data which can undergo the color appearance conversion.

4. A color processing apparatus for generating a lookup table for color processing constructed by plural grid points including a grid point which corresponds to color data without a visible range, comprising:

a converter, arranged to generate color appearance data by applying color appearance conversion using a color appearance model to color data corresponding to the plural grid points;

a color processor, arranged to apply color processing to the color appearance data;

a generator, arranged to generate the lookup table based on the color appearance data to which the color processing is applied;

a memory, arranged to hold information specifying input color data which cannot undergo color the appearance conversion; and a calculator, arranged to calculate color appearance data of input color data specified by the held information from color appearance data of input color data which can undergo the color appearance conversion.

5. A method of generating a lookup table for color processing constructed by plural grid points, each of which corresponds to input color data both inside and outside of a visible range and represents output color data corresponding to the input color data, said method comprising the steps of:

generating color appearance data by applying color appearance conversion using a color appearance model to the input color data corresponding to the plural grid points;

applying color processing to the color appearance data;

generating the lookup table representing the color appearance data to which the color processing is applied as the output color data;

holding information specifying input color data which cannot undergo the color appearance conversion;

substituting color appearance data of input color data specified by the held information with color appearance data of input color data which can undergo the color appearance conversion, or predicting the color appearance data of input color data specified by the held information from the color appearance data of input color data which can undergo the color appearance conversion; and storing the lookup table in a memory.

6. The method according to claim 5, wherein in the substituting or predicting step, the color appearance data of input color data, which can undergo the color appearance conversion and positions closely to input color data which cannot undergo the color appearance conversion, is substituted for the color appearance data of the input color data which cannot undergo the color appearance conversion.

7. The method according to claim 5, wherein in the substituting or predicting step, the color appearance data of input color data which cannot undergo the color appearance conversion is predicted from the color appearance data of input color data which can undergo the color appearance conversion and positions closely to the input color data which cannot undergo the color appearance conversion.

8. A method of generating a lookup table for color processing constructed by plural grid points, each of which corresponds to input color data both inside and outside of a visible range and represents output color data corresponding to the input color data, said method comprising the steps of:

generating color appearance data by applying color appearance conversion using a color appearance model to the input color data corresponding to the plural grid points;

applying color processing to the color appearance data;

generating the lookup table representing the color appearance data to which the color processing is applied as the output color data;

holding information specifying input color data which cannot undergo the color appearance conversion;

predicting color appearance data of input color data specified by the held information from color appearance data of input color data which can undergo the color appearance conversion; and storing the lookup table in a memory.

9. A color processing apparatus for generating a lookup table for color processing constructed by plural grid points, each of which corresponds to input color data both inside and outside of a visible range and represents output color data corresponding to the input color data, comprising:

a converter, configured to generate color appearance data by applying color appearance conversion using a color appearance model to the input color data corresponding to the plural grid points;

a color processor, configured to apply color processing to the color appearance data;

a generator, configured to generate the lookup table representing the color appearance data to which the color processing is applied as the output color data;

a memory, configured to hold information specifying input color data which cannot undergo color the appearance conversion; and a substitution or prediction section, configured to substitute color appearance data of input color data specified by the held information with color appearance data of input color data which can undergo the color appearance conversion, or to predict the color appearance data of input color data specified by the held information from the color appearance data of input color data which can undergo the color appearance conversion.

10. A color processing apparatus for generating a lookup table for color processing constructed by plural grid points, each of which corresponds to input color data both inside and outside of a visible range and represents output color data corresponding to the input color data, comprising:

a converter, configured to generate color appearance data by applying color appearance conversion using a color appearance model to the input color data corresponding to the plural grid points;

a color processor, configured to apply color processing to the color appearance data;

a generator, configured to generate the lookup table representing the color appearance data to which the color processing is applied as the output color data;

a memory, configured to hold information specifying input color data which cannot undergo color the appearance conversion; and a predictor, configured to predict color appearance data of input color data specified by the held information from color appearance data of input color data which can undergo the color appearance conversion.

* * * * *